United States Patent
Valli et al.

(10) Patent No.: US 12,063,389 B2
(45) Date of Patent: Aug. 13, 2024

(54) 3D PREDICTION METHOD FOR VIDEO CODING

(71) Applicant: Rovi Guides, Inc., San Jose, CA (US)

(72) Inventors: Seppo Valli, Espoo (FI); Pekka Siltanen, Helsinki (FI)

(73) Assignee: Rovi Guides, Inc., San Jose, CA (US)

( * ) Notice: Subject to any disclaimer, the term of this patent is extended or adjusted under 35 U.S.C. 154(b) by 117 days.

(21) Appl. No.: 17/984,997

(22) Filed: Nov. 10, 2022

(65) Prior Publication Data

US 2024/0163477 A1    May 16, 2024

(51) Int. Cl.
| | |
|---|---|
| *H04N 19/597* | (2014.01) |
| *H04N 19/124* | (2014.01) |
| *H04N 19/136* | (2014.01) |
| *H04N 19/159* | (2014.01) |
| *H04N 19/166* | (2014.01) |
| *H04N 19/172* | (2014.01) |
| *H04N 19/89*  | (2014.01) |

(52) U.S. Cl.
CPC ......... *H04N 19/597* (2014.11); *H04N 19/124* (2014.11); *H04N 19/136* (2014.11); *H04N 19/159* (2014.11); *H04N 19/166* (2014.11); *H04N 19/172* (2014.11); *H04N 19/89* (2014.11)

(58) Field of Classification Search
CPC .. H04N 19/597; H04N 19/124; H04N 19/136; H04N 19/159; H04N 19/166; H04N 19/172; H04N 19/89
See application file for complete search history.

(56) References Cited

U.S. PATENT DOCUMENTS

| | | | |
|---|---|---|---|
| 7,894,525 B2* | 2/2011 | Piehl | G06T 7/223 |
| | | | 375/135 |
| 11,237,413 B1* | 2/2022 | Weber | G02B 5/3016 |

(Continued)

FOREIGN PATENT DOCUMENTS

WO    2019183211 A1    9/2019

OTHER PUBLICATIONS

Akeley, Kurt, et al., "A Stereo Display Prototype with Multiple Focal Distances", ACM Trans. Graph. (2004) 23, 3, 804-813.

(Continued)

*Primary Examiner* — Joseph Suh
(74) *Attorney, Agent, or Firm* — Haley Guiliano LLP

(57) ABSTRACT

Systems and methods are provided for using a Multiple Depth Plane (MDP) prediction in predictive coding. The system detects a camera viewpoint change between a current frame and a previous frame, decomposes a reconstructed depth map of the previous frame to a plurality of depth planes, adjusts the plurality of depth planes from a previous camera viewpoint to correspond with a current camera viewpoint, generates an MDP prediction by summing pixel values of the adjusted plurality of depth planes along a plurality of optical axes from the current camera viewpoint, determines an MDP prediction error between the MDP prediction and a depth map of the current frame, quantizes and codes the MDP prediction error, and transmits, to a receiver over a communication network, the camera viewpoint change and the coded quantized MDP prediction error for reconstruction of a depth map of the current frame.

20 Claims, 17 Drawing Sheets
(6 of 17 Drawing Sheet(s) Filed in Color)

(56) References Cited

U.S. PATENT DOCUMENTS

| | | | | |
|---|---|---|---|---|
| 11,582,510 | B2* | 2/2023 | Han | H04N 21/44016 |
| 2014/0028663 | A1* | 1/2014 | Smithwick | G02B 30/56 |
| | | | | 345/589 |
| 2016/0134932 | A1* | 5/2016 | Karp | H04L 67/125 |
| | | | | 348/207.11 |
| 2017/0307891 | A1* | 10/2017 | Bucknor | G01S 1/70 |
| 2020/0302686 | A1* | 9/2020 | Totty | G06T 17/00 |
| 2020/0312010 | A1* | 10/2020 | Andersson | G06T 15/06 |
| 2022/0058871 | A1* | 2/2022 | Cheng | G06T 17/205 |
| 2024/0054667 | A1* | 2/2024 | Ollila | G06T 5/50 |

OTHER PUBLICATIONS

Chan, Yui-Lam, et al., "Overview of current development in depthmap coding of 3D video and its future", IET Signal Process., (2020) 14: 1-14. https://doi.org/10.1049/iet-spr.2019.0063.

Gauglitz, Steffen, et al., "Evaluation of Interest Point Detectors and Feature Descriptors for Visual Tracking", International Journal of Computer Vision (2011) 94:335-360.

Jonchery, Claire, et al., "Camera motion estimation through planar deformation determination", (2008)arXiv:cs/0610059, retrieved on Jan. 24, 2023.

Zhu, Linwei, et al., "View-spatial-temporal post-refinement for view synthesis in 3D video systems", Signal Processing: Image Communication 28, (2013) pp. 1342-1357.

U.S. Appl. No. 17/984,994, filed Nov. 10, 2022, Seppo Valli.

* cited by examiner

1600

1604
DECOMPOSE A RECONSTRUCTED TEXTURE DATA OF THE PREVIOUS FRAME TO A PLURALITY OF FOCAL PLANES, WHEREIN THE RECONSTRUCTED TEXTURE DATA OF THE PREVIOUS FRAME IS BASED ON TEXTURE DATA OF THE PREVIOUS FRAME

1606
ADJUSTING THE PLURALITY OF FOCAL PLANES FROM THE PREVIOUS CAMERA VIEWPOINT TO CORRESPOND WITH THE CURRENT CAMERA VIEWPOINT

1608
GENERATE A MULTI FOCAL PLANE (MFP) PREDICTION BY SUMMING PIXEL VALUES OF THE ADJUSTED PLURALITY OF FOCAL PLANES ALONG A SECOND PLURALITY OF OPTICAL AXES FROM THE CURRENT CAMERA VIEWPOINT

1610
DETERMINE AN MFP PREDICTION ERROR BETWEEN THE MFP PREDICTION AND THE TEXTURE DATA OF THE CURRENT FRAME

1612
QUANTIZE AND CODE THE MFP PREDICTION ERROR

1614
TRANSMIT, TO A RECEIVER OVER A COMMUNICATION NETWORK, THE CODED QUANTIZED MFP PREDICTION ERROR FOR RECONSTRUCTION OF THE TEXTURE DATA OF THE CURRENT FRAME

FIG. 16

3D PREDICTION METHOD FOR VIDEO CODING

BACKGROUND

This disclosure is directed to systems and methods for coding video frames, and in particular, a 3D prediction method.

SUMMARY

Applications and needs for efficient video compression and delivery are increasing rapidly. For example, 3D virtual environments may require memory dense storage of 3D video data for use in Augmented Reality (AR) or Virtual Reality (VR) applications. Storage of such massive information without compressing is taxing on storage systems and is very computationally intensive. Moreover, an attempt to transmit such data via a network is extremely bandwidth demanding and may cause network delays and unacceptable latency. Transition to support the delivery of real-time 3D, AR, and VR content in high quality and resolution also over wireless/mobile connections requires more efficient compression methods and standards.

The present disclosure addresses the problems described above, by, for example, providing systems and methods using a Multi Focal Plane (MFP) prediction and/or a Multiple Depth Plane (MDP) prediction for forming and improving a 3D prediction in predictive coding.

In some embodiments, the system (e.g., a codec application, a system using a codec application, etc.) may detect a camera viewpoint change between a current frame from a current camera viewpoint to a previous frame from a previous camera viewpoint. For example, the system may detect the camera viewpoint change by deriving the camera viewpoint change by using tracking information from position sensors, deriving the camera viewpoint change by using the current frame and the previous frame, or some combination thereof. The current frame may represent a 3D scene.

The system may decompose a reconstructed previous frame to a plurality of focal planes. The reconstructed previous frame may be based on the previous frame. For example, the plurality of focal planes may include five focal planes that are regularly spaced in distance. In some embodiments, the plurality of focal planes may be irregularly spaced in distance. In some embodiments, the plurality of focal planes may be any suitable number of focal planes. In some embodiments, the plurality of focal planes may be any suitable number of focal planes and may be regularly or irregularly spaced in distance.

The system may adjust the plurality of focal planes from the previous camera viewpoint to correspond with the current camera viewpoint. For example, the system may adjust the plurality of focal planes by shifting each of the plurality of focal planes with a corresponding amount based on the camera viewpoint change, and scaling each of the plurality of focal planes by a corresponding scale factor based on the camera viewpoint change. A focal plane of the plurality of focal planes that is closer to the current camera viewpoint may be shifted more and scaled larger in comparison to a focal plane of the plurality of focal planes that is further from the current camera viewpoint.

The system may generate a Multi Focal Plane (MFP) prediction by summing pixel values of the adjusted plurality of focal planes along a plurality of optical axes from the current camera viewpoint. For example, the plurality of optical axes may be a family of non-parallel lines going through the camera viewpoint (e.g., eye-point) and through each of the corresponding pixels in the adjusted plurality of focal planes (e.g., MFP stack). The plurality of optical axes may intersect a focal plane of the adjusted plurality of focal planes at a plurality of intersection points. In some embodiments, a distance between a first intersection point and a second intersection point of the plurality of intersection points may be less than a pixel spacing of an image corresponding to the focal plane. In some embodiments, the system may generate the MFP prediction by summing pixel values along each optical axis based on as many axes as there are pixels in an image corresponding to the focal plane. In some embodiments, the system may generate the MFP prediction by summing pixel values along optical axes corresponding to a portion of the pixels in an image corresponding to the focal plane (e.g., family of non-parallel lines going through the camera viewpoint and through a portion of the pixels in the image, such as skipping a neighboring pixel, etc.).

The system may determine an MFP prediction error between the MFP prediction and the current frame. For example, the system may subtract the MFP prediction from the current frame. The system may code the MFP prediction error. For example, the system may quantize and code the MFP prediction error. For example, the system may quantize the MFP prediction error and code the quantized MFP prediction error. The system may transmit, to a receiver over a communication network, the camera viewpoint change and the coded MFP prediction error (e.g., coded quantized MFP prediction error) for reconstruction of the current frame and display of the 3D scene.

In some embodiments, the system may generate a 2D intra prediction based on previously reconstructed pixels of the current frame. In some embodiments, the system may generate a 2D intra prediction based on one or more reconstructed pixels of the current frame. The system may generate a 2D inter prediction based on one or more reconstructed previous frames. The system may determine a 2D intra prediction error between the 2D intra prediction and the current frame. The system may determine a 2D inter prediction error between the 2D inter prediction and the current frame. The system may determine a smallest error of the MFP prediction error, the 2D intra prediction error, and 2D inter prediction error. The system may select a mode (e.g., prediction mode, coding mode) corresponding to a type of prediction associated with the smallest error. The system may transmit the selected mode to the receiver over the communication network. The selected mode may correspond to the MFP prediction in response to the MFP prediction error being the smallest error. In response to the MFP prediction error being the smallest error, the system may transmit the camera viewpoint change and the coded quantized MFP prediction error.

In some embodiments, the system may capture the previous frame at a previous time, code the previous frame, transmit the coded previous frame to the receiver over the communication network, and capture the current frame at a current time being the previous time plus a frame delay. The frame delay may be based on quantization accuracy in coding based on feedback from a status of the communication network or a status of the receiver over the communication network. The current frame and the previous frame may be each represented using video frame and a corresponding depth map.

In some embodiments, the system detects a camera viewpoint change between a current frame from a current camera viewpoint to a previous frame from a previous camera viewpoint. The current frame may represent a 3D scene. The system may decompose a reconstructed depth map of the previous frame to a plurality of depth planes. The reconstructed depth map of the previous frame may be based on a depth map of the previous frame. The system may adjust the plurality of depth planes from the previous camera viewpoint to correspond with the current camera viewpoint. The system may generate a Multi Depth Plane (MDP) prediction by summing pixel values of the adjusted plurality of depth planes along a first plurality of optical axes from the current camera viewpoint. The system may determine an MDP prediction error between the MDP prediction and a depth map of the current frame. The system may quantize and code the MDP prediction error. The system may transmit, to a receiver over a communication network, the camera viewpoint change and the coded quantized MDP prediction error for reconstruction of the depth map of the current frame.

In some embodiments, the system decomposes a reconstructed texture data from the previous frame to a plurality of focal planes. The reconstructed texture data from the previous frame may be based on texture data of the previous frame. In some embodiments, texture data may be color image data, e.g., YCbCr or RGB data, or color image data in any suitable color format. The system may adjust the plurality of focal planes from the previous camera viewpoint to correspond with the current camera viewpoint. The system may generate a Multi Focal Plane (MFP) prediction by summing pixel values of the adjusted plurality of focal planes along a second plurality of optical axes from the current camera viewpoint. The system may determine an MFP prediction error between the MFP prediction and the texture data of the current frame. The system may quantize and code the MFP prediction error. The system may transmit, to a receiver over a communication network, the coded quantized MFP prediction error for reconstruction of texture data of the current frame.

In some embodiments, the system generates a 2D intra prediction based on previously reconstructed pixels of the current frame. The system may generate a 2D inter prediction based on one or more reconstructed previous frames. The system may determine a 2D intra prediction error between the 2D intra prediction and the current frame. The system may determine a 2D inter prediction error between the 2D inter prediction and the current frame. The system may determine MDP and MFP prediction errors separately by subtracting the MDP prediction and the MFP prediction from the corresponding components (texture or depth map) of the current frame. The system may determine a smallest error of MDP and MFP prediction errors, the 2D intra prediction errors for MDP and MFP, and 2D inter prediction errors for MDP and MFP. The system may select a mode corresponding to a type of prediction associated with the smallest error. The system may transmit the selected mode to the receiver over the communication network. The selected mode may correspond to the MDP prediction and the MFP prediction in response to the MDP and MFP prediction error being the smallest error. The system may transmit the camera viewpoint change, the coded quantized MDP prediction error, and the coded quantized MFP prediction error is in response to the MDP and MFP prediction errors being the smallest errors.

In some embodiments, the system generates a 2D intra depth map prediction based on previously reconstructed pixels of the depth map of the current frame. In some embodiments, the system generates a 2D intra depth map prediction based on one or more reconstructed pixels of the depth map of the current frame. The system may generate a 2D inter depth map prediction based on one or more reconstructed depth maps of the previous frames. The system may determine a 2D intra depth map prediction error between the 2D intra depth map prediction and the depth map of the current frame. The system may determine a 2D inter depth map prediction error between the 2D inter depth map prediction of the depth map and the depth map of the current frame. The system may determine a smallest depth map error of the MDP prediction error, the 2D intra depth map prediction error, and 2D inter depth map prediction error. The system may select a depth map mode corresponding to a type of depth map prediction associated with the smallest depth map error.

In some embodiments, the system may generate a 2D intra texture data prediction based on one or more reconstructed pixels of the texture data of the current frame. The system may generate a 2D inter texture data prediction based on one or more reconstructed texture data of the previous frames. The system may determine a 2D intra texture data prediction error between the 2D intra texture data prediction and the texture data of the current frame. The system may determine a 2D inter texture data prediction error between the 2D inter texture data prediction and the texture data of the current frame. The system may determine a smallest texture data prediction error of the MFP prediction error, the 2D intra texture data prediction error, and 2D inter texture data prediction error. The system may select a texture data mode corresponding to a type of texture data prediction associated with the smallest texture data error.

In some embodiments, a system transmits the selected depth map mode and the selected texture data mode to the receiver over the communication network. The selected depth map mode may correspond to the MDP prediction in response to the MDP prediction error being the smallest depth map error. The selected texture data mode may correspond to the MFP prediction in response to the MFP prediction error being the smallest texture data error. The system may transmit the camera viewpoint change, the coded quantized MDP prediction error, and the coded quantized MFP prediction error in response to the MDP prediction error being the smallest depth map error and the MFP prediction error being the smallest texture data error.

In some embodiments, the systems and methods use an MFP and/or MDP prediction for forming and improving a 3D prediction in predictive coding. In some embodiments, the system applies depth-blended weight planes to a depth map (i.e., to the origin of weight planes themselves) and may further apply resulting MDPs for synthesizing new viewpoints to the depth map. In some embodiments, depth blending may be performed without forming weight planes (i.e. intermediate results in image format). For example, depth blending may be a pixel based operation, and depth blending may be made pixel by pixel using the depth blending functions. In some embodiments, depth blending may be performed using pixel-by-pixel processing, without forming intermediate results in image format.

In some embodiments, the systems and methods may decode an MFP prediction error. In some embodiments, the system receives, from a transmitter over a communication network, a camera viewpoint change and coded quantized MFP prediction error for reconstruction of a current frame and display of a 3D scene. The system may decompose a reconstructed previous frame to a plurality of focal planes. The reconstructed previous frame may be based on a previous frame. The system may adjust the plurality of focal planes from a previous camera viewpoint to correspond with a current camera viewpoint based on the camera viewpoint change. The system may generate an MFP prediction by summing pixel values of the adjusted plurality of focal planes along a plurality of optical axes from the current camera viewpoint. The system may decode the coded quantized MFP prediction error to generate a quantized MFP prediction error. The system may sum the quantized MFP prediction error and the MFP prediction to reconstruct the current frame. In some embodiments, the system receives, from the transmitter over the communication network, a selected mode corresponding to the MFP prediction.

In some embodiments, the systems and methods may decode an MDP prediction error. In some embodiments, the system receives, from a transmitter over a communication network, a camera viewpoint change and a coded quantized MDP prediction error for reconstruction of a depth map of a current frame. The system may decompose a reconstructed depth map of a previous frame to a plurality of depth planes. The reconstructed depth map of the previous frame may be based on a depth map of the previous frame. The system may adjust the plurality of depth planes from the previous camera viewpoint to correspond with a current camera viewpoint based on the camera viewpoint change. The system may generate an MDP prediction by summing pixel values of the adjusted plurality of depth planes along a first plurality of optical axes from the current camera viewpoint. The system may decode the coded quantized MDP prediction error to generate a quantized MDP prediction error. The system may sum the quantized MDP prediction error and the MDP prediction to reconstruct the depth map of the current frame.

In some embodiments, the system may receive, from the transmitter over the communication network, a coded quantized MFP prediction error for reconstruction of texture data of the current frame. The system may decompose a reconstructed texture data of a previous frame to a plurality of focal planes. The reconstructed texture data of a previous frame may be based on texture data of a previous frame. The system may adjust the plurality of focal planes from a previous camera viewpoint to correspond with the current camera viewpoint based on the camera viewpoint change. The system may generate an MFP prediction by summing pixel values of the adjusted plurality of focal planes along a plurality of optical axes from the current camera viewpoint. The system may decode the coded quantized MFP prediction error to generate a quantized MFP prediction error. The system may sum the quantized MFP prediction error and the MFP prediction of a previous frame to reconstruct the texture data of the current frame.

In some embodiments, the system receives, from the transmitter over the communication network, a selected mode corresponding to the MFP prediction and the MDP prediction. In some embodiments, the system receives, from the transmitter over the communication network, a selected mode (e.g., selected mode for depth map, selected depth map mode) corresponding to the MDP prediction. In some embodiments, the system receives, from the transmitter over the communication network, a selected mode (e.g., selected mode for texture data, selected texture data mode) corresponding to the MFP prediction. In some embodiments, the system receives, from the transmitter over the communication network, a selected texture data mode corresponding to the MFP prediction and a selected depth map mode corresponding to the MDP prediction.

As a result of the use of these techniques, 3D media content (e.g., current frame representing a 3D scene, video frame and/or corresponding depth map) may be efficiently encoded for storage and/or transmission and decoded for display of a 3D scene.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 16 is a flowchart of a detailed illustrative process for generating and using an MFP prediction for coding video textures in predictive coding, in accordance with some embodiments of this disclosure.

DETAILED DESCRIPTION

Systems and methods are described herein for using a Multi Focal Plane (MFP) and/or a Multiple Depth Plane (MDP) prediction for forming and improving a 3D prediction in predictive coding. Also described herein are system and methods for applying depth-blended weight planes to a depth map (i.e., to the origin of weight planes themselves), and systems and methods that may further apply resulting MDPs for synthesizing new viewpoints to the depth map.

The disclosed approach may improve prediction and coding efficiency over existing methods and standards when the capture device (e.g. a texture and depth camera, RGB-D camera, or any suitable texture and depth sensor/camera, etc.) is moving in the space. It may be common for the capture device to move when shooting scenes for visual content, for example when a mobile capturing device (including a mobile phone) is used. In these situations, the disclosed approach may give good efficiency without a considerable increase in complexity, processing power, or memory consumption.

Reducing differences between successive video frames (i.e., bitrate) may be done by compensating camera motion. However, if using complete video (plus depth) frames, the result may be sensitive to any inaccuracy or lack of information (e.g., for the depth data, which may have holes (voids) and errors due to inadequate backscatter from the scene). A 3D prediction based on an MFP and/or MDP prediction may be better (e.g., improve prediction and efficiency) than traditional predictions based on motion compensated 2D blocks. The MFP and/or MDP prediction may be taken to be one of several prediction options. The MFP and/or MDP prediction may be selected by the encoder when the MFP and/or MDP prediction is better than other prediction options, while a poor MFP and/or MDP prediction (e.g., due to low quality of received depth data) may be rejected by the encoder.

Figure 1:
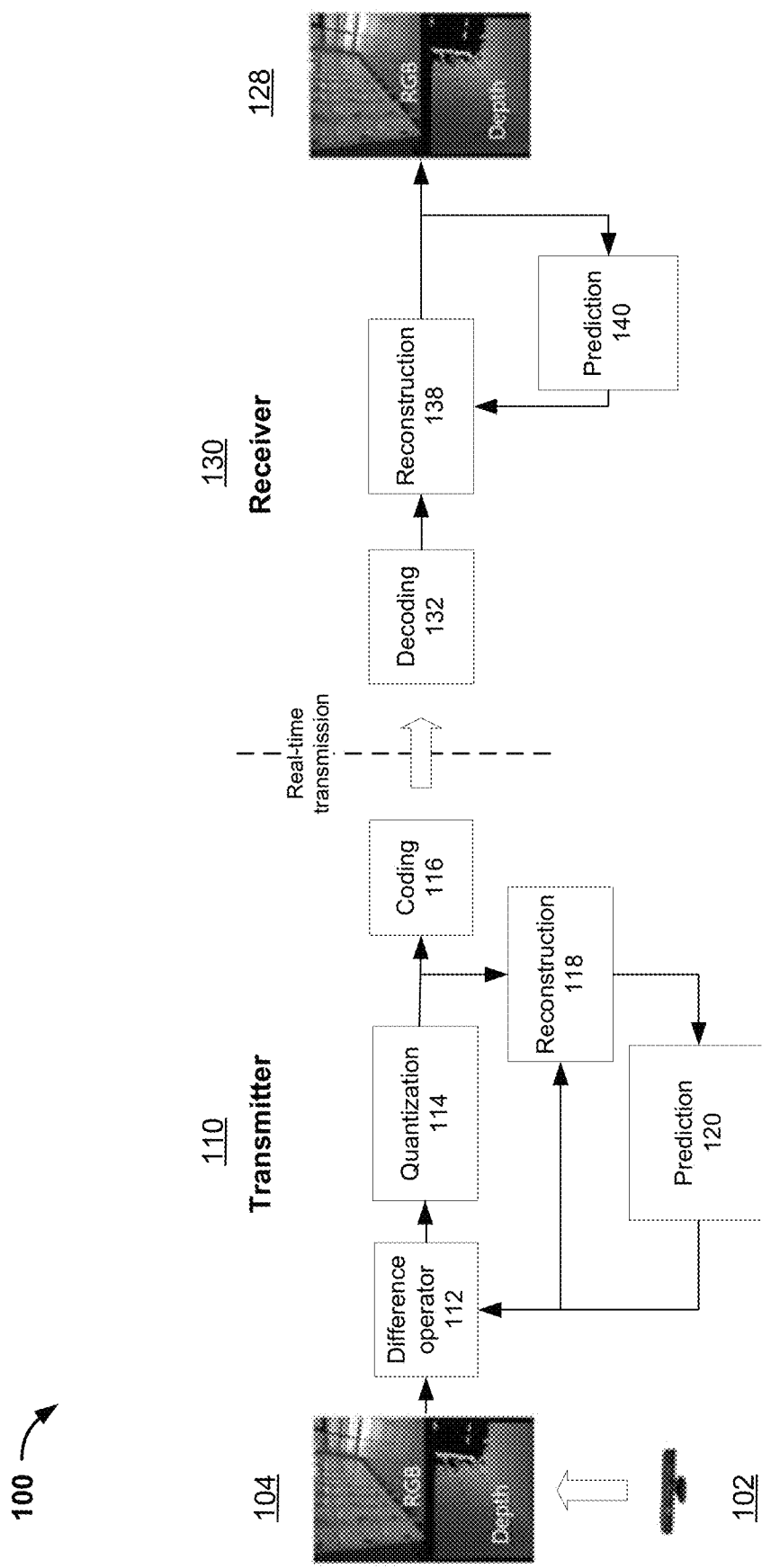
FIG. 1 shows an illustrative example of a simplified schematic block diagram of a predictive coding system, in accordance with some embodiments of this disclosure.

FIG. 1 shows an illustrative example of a simplified schematic block diagram of a predictive coding system 100, in accordance with some embodiments of this disclosure. For example, 3D content may be coded using block-based predictive coding methods (e.g., originally developed for 2D video). In predictive coding, the coding efficiency may largely be achieved by a set of predictions for the block to be coded, reducing the bits for coding, and transmitting the residual (i.e., the difference between the incoming block and its prediction). 3D content may be coded using block-based predictive coding method by coding a sequence of video textures (each a 2D color image) and corresponding depth maps (each a monochrome image), indicating both the colors and distances (from the camera) of the corresponding pixels in the captured volume. The data format of a sequence of video textures and corresponding depth maps may be used for stereoscopic 3D (S3D) displays and may be coded by applying traditional video coding approaches.

The predictive coding system 100 may include a transmitter 110 (e.g., encoder) and a receiver 130 (e.g., decoder). As an example, a sensor device 102 may provide a stream of texture and depth data (e.g., texture and depth map) as input to a transmitter 110, the transmitter 110 may transmit processed input data representing the stream of texture and depth data to the receiver 130, and the receiver 130 may process the received transmitted data to output a stream of texture and depth data (e.g., sequence of texture and depth frames). The transmitter 110 may include a difference operator block 112, a quantization block 114, a coding block 116, a reconstruction block 118, and a prediction block 120. The receiver 130 may include a decoding block 132, a reconstruction block 138, and a prediction block 140. In some embodiments, the prediction block 120 and the prediction block 140 may be a prediction (including delay) block. In some embodiments, the coding block 116 is a channel coding block, and the decoding block 132 is a channel decoding block.

FIG. 1 illustrates that both texture and depth data may be coded and decoded with a similar or same predictive coding solution. For simplicity, only one set of corresponding blocks for the transmitter 110 and the receiver 130 is shown in FIG. 1; however, other embodiments may include additional sets of corresponding blocks. For example, the transmitter 110 and the receiver 130 may each include first and second set of corresponding blocks, each set of blocks in the transmitter 110 and the receiver 130 used for separately coding and decoding texture and depth data (e.g., texture and depth images). A set of blocks for transmitter 110 may be a difference an operator block 112, a quantization block 114, a coding block 116, a reconstruction block 118, and a prediction block 120. A set of blocks for receiver 130 may be a decoding block 132, a reconstruction block 138, and a prediction block 140. A first set of corresponding blocks of the transmitter 110 and a first set of corresponding blocks of the receiver 130 may be used to process texture data of a frame, and a second set of corresponding blocks of the transmitter 110 and a second set of corresponding blocks of the receiver 130 may to process depth data of a frame. In some embodiments, texture data may be color image data, e.g., YCbCr or RGB data, or color image data in any suitable color format. In some embodiments, depth data of a frame is depth map data. In some embodiments, a depth map may be a monochrome image. In some embodiments, a depth map may indicate color pixel distances and distances of its own pixels (e.g., pixels of the depth map itself, when decomposing a depth map to multiple depth planes).

In predictive coding, a reconstructed frame may be the previous frame, which may be identically reconstructed both at the encoder and the decoder and used for predicting each new image (or each pixel, block, or an area of an image). As a decoded signal may contain all coding errors produced by the encoder, the decoder may be also a part of the encoder to provide an identical prediction. For example, FIG. 1 shows an identical prediction loop at both ends (e.g., the transmitter 110 and receiver 130 both include a prediction loop each with a reconstruction block and a prediction block). For example, the transmitter 110 includes a reconstruction block 118 and a prediction block 120, and the receiver 130 includes a reconstruction block 138 and a prediction block 140. In some embodiments, prediction block 120 may correspond to (e.g., is similar to, the same as)

prediction block 140. In some embodiments, reconstruction block 118 may correspond to (e.g., is similar to, the same as) reconstruction block 138. Identically reconstructed frame(s) may be used as the basis of a set of identically formed predictions. When coding a block, the transmitter 110 may choose the prediction it considers the best (e.g., based on prediction distortion and rates, prediction with smallest error), and may send the corresponding coding mode selection (and coded differences) to the receiver 130. For example, the transmitter 110 may choose the prediction it considers best based on prediction (e.g., prediction with the least distortion). For example, the transmitter 110 may choose the prediction it considers best based on rates (e.g., bitrate and/or amount of bits produced for each prediction). In some embodiments, when a coding mode is chosen based on rate and distortion, a lower quality coding mode may be chosen if the coding mode produces a prediction with fewer bits. The receiver 130 may receive the corresponding coding mode selection (and coded differences) from the transmitter 110.

A sensor device 102 (e.g., a texture and depth sensor, RGB-D sensor, or any suitable texture and depth sensor/camera) may capture a new frame 104 (e.g., texture and depth map), and may provide the new frame 104 to the transmitter 110. The transmitter 110 may receive the new frame 104 (e.g., current frame). In some embodiments, a difference operator block 112 of the transmitter 110 may receive the new frame 104.

In some embodiments, the difference operator block 112 computes a difference of incoming signals. For example, the difference operator block 112 may compute a prediction error (e.g., difference or residual of a prediction to a target frame). For example, the input to the difference operator block 112 may be a target frame (e.g., new frame 104, current frame) and a prediction (e.g., output of prediction block 120). The difference operator block 112 may compute the prediction error by subtracting the prediction from the target frame (e.g., subtracting the output from the prediction block 120 from the new frame 104). The difference operator block 112 may output the prediction error. The quantization block 114 may receive the prediction error.

In some embodiments, the prediction error is input to the quantization block 114, and the quantization block 114 quantizes the prediction error. For example, the quantization block 114 may generate a quantized difference signal that may be a version of the signal with successive steps instead of more continuous values.) In some embodiments, the quantization block 114 (e.g., quantizer) reduces the number of values a signal is represented with. For example, the quantization block 114 may relabel (renumber, and e.g., by assigning variable length codes for) those values, may generate a reduced set of codes, resulting saving in bits (indices) when addressed. In some embodiments, the quantization block 114 may be a vector quantizer (VQ). The quantization block 114 may output the quantized prediction error.

In some embodiments, the prediction error may be transformed before being quantized. For example, the system may include a discrete cosine transform (DCT) block turning the signal values into another, more compact set of parameters. When including e.g., a DCT block, the system may also include an inverse transformation block. For example, although not shown in FIG. 1 for simplicity, a transform (e.g., DCT) block may be inserted before the quantization block 114, and an inverse transform (e.g., $DCT^{-1}$) block may be inserted before the reconstruction block 318. The transform block may convert a signal (e.g., prediction error) to a transformed signal in a different signal space (e.g., transformed signal error), and the inverse transform block may inverse transform the transformed signal to a signal in the same (image) space for reconstruction.

The coding block 116 may replace the reduced set of signal values (e.g., quantized error) with (statistically) shorter codes to reduce bits. The input of the coding block 116 may be data (e.g., image data in a form of an image). The coding block 116 may code the data and output coded data (e.g., coded data may be data that is no longer in a form of an image such as a frame of pixels). In some embodiments, the coding block 116 is a channel coding block. In some embodiments, coding is combined with error correction coding (which may increase redundancy and bits). In some embodiments, the quantization block 114 may be optional, the input to the coding block 116 may be a prediction error (e.g., output of difference operator 112), and the coding block 116 may output a coded prediction error. In some embodiments, the transmitter 110 may transmit the coded prediction error. In some embodiments, the quantized prediction error is input to the coding block 116, and the coding block 116 codes the quantized prediction error and outputs a coded quantized prediction error. The transmitter 110 may transmit the coded quantized prediction error in real-time transmission.

In some embodiments, the reconstruction block 118 generates a reconstructed frame (e.g., previous frame). In some embodiments, the input to the reconstruction block may be the MFP prediction error and the output of the prediction block 120 (e.g., a prediction, a prediction including delay), and the reconstruction block 118 may generate a reconstructed frame from the MFP prediction error and the output of the prediction block 120. A reconstructed frame may be older than the current input frame (e.g., by one frame delay). In some embodiments, the input to the reconstruction block 118 may be the output of quantization block 114 (e.g., a quantized prediction error) and the output of the prediction block 120 (e.g., a prediction, a prediction including delay). The reconstruction block 118 may sum the output of quantization block 114 (e.g., a quantized prediction error) and the output of the prediction block 120 (e.g., a prediction, a prediction including delay) to generate a reconstructed frame. For example, the reconstructed frame may be a reconstruction of a previous frame. A reconstructed frame may be quantized, (i.e., presented more coarsely), (i.e., includes quantization errors), and may be older than the current input frame (e.g., by one frame delay).

In some embodiments, the prediction block 120 generates a prediction of the reconstructed frame. For example, the prediction block 120 may generate a prediction including delay. Predictions may be made using previously coded information, and may be made in the same way in the encoder and decoder. For example, in the encoder and the decoder, predictions may be made w.r.t a common (same) reference pixels/time in history. There may be several different delays depending on prediction. Delays may be used to address previously coded information. For example, a prediction may be an extrapolation or interpolation of neighboring pixels in a previously coded image, and the previously coded image may be addressed by a suitable delay or delays. The input to the prediction block 120 may be the reconstructed frame (e.g., previous frame). The output to the prediction block 120 may be a prediction including a frame delay. The output of the prediction block 120 may be input to the difference operator block 112. The output of the prediction block 120 may be input to the reconstruction block 118.

In some embodiments, the receiver 130 receives the coded quantized prediction error transmitted from the transmitter 110. In some embodiments, the decoding block 132 receives the coded quantized prediction error transmitted from the transmitter 110 as an input, and the decoding block 132 may decode the coded quantized prediction error to generate the quantized prediction error. In some embodiments, the decoding block 132 is a channel decoding block. In some embodiments, the decoding block 132 may decode the coded quantized prediction error by replacing statistically shorter codes with corresponding expanded bits. As an example, after performing channel decoding, quantized values/differences may be obtained e.g., by addressing a look-up table by corresponding indices.

In some embodiments, the reconstruction block 138 is similar to the reconstruction block 118, except the inputs to the reconstruction block 138 are the outputs of the decoding block 132 and the prediction block 140. The reconstruction block 138 may sum the output of the decoding block 132 (e.g., a quantized prediction error) and the output of the prediction block 140 (e.g., a prediction, prediction including delay) to generate the reconstructed frame 128. In some embodiments, the reconstruction block 118 may add the prediction error to the output of the prediction block 140 (e.g., a prediction, prediction including delay) to generate the reconstructed frame 128. The reconstructed frame 128 may be output to the prediction block 140. A reconstructed frame may be quantized, (i.e., presented more coarsely), (i.e., includes quantization errors), and may be older than the current input frame (e.g., by one frame delay).

In some embodiments, the prediction block 140 generates a prediction of a reconstructed frame. In some embodiments, the prediction block 140 generates a prediction including delay of a reconstructed frame. Predictions may be made using previously coded information, in a same way in the encoder and decoder (e.g., wr.t a common (same) reference pixels/time in history). In some embodiments, the prediction block 140 is similar to (e.g., the same as) the prediction block 120. The input to the prediction block 140 may be the reconstructed frame 128 (e.g., previous frame). The output to the prediction block 114 may be a prediction including delay of the reconstructed frame 128.

Although FIG. 1 illustrates that both texture and depth may be coded/decoded with a similar or same predictive coding solution, in some embodiments, texture and depth images may be concatenated (e.g., "side-by-side") and processed as image information. In other embodiments, the depth stream may have its own predictive coding implementation.

The use of MFP prediction for forming a 3D prediction in predictive coding may improve the coding efficiency of video-plus-depth (texture plus depth map) type of signals. The use of MFP prediction may also be used with one or more other coding methods applied for the depth data in parallel with the video (e.g., a hierarchical quadtree method). Details of a recent coding method (3D-HEVC) for video plus depth signals, including an option for the quadtree coding of depth data, is described in Chan, Yui-Lam, et al. "Overview of current development in depth map coding of 3D video and its future." IET Signal Processing 14.1 (2020): 1-14, which is herein incorporated by reference in its entirety.

MFP displays have recently been developed to support natural accommodation/focus when viewing visual content. MFP decompositions may be based on video plus depth format, and instead of supporting natural accommodation/focus, may be used as described herein to improve coding methods.

3D Representations

A texture and depth map format may be used to describe 3D viewpoints. In addition to the color texture, video coding algorithms may work well with solid depth maps, i.e. surfaces without too much holes or distortions.

Recently, texture and depth cameras (e.g., RGB-D cameras, etc.) have become common in capturing video plus depth information. However, depth maps produced by these sensors may often be incomplete, have holes, and discontinuities which are not the real properties of the scene, but may be caused for example by insufficient or excessive ambient light, or by the lack of sensor's range (for detecting the backscatter of its own light source).

In some embodiments, a 3D representation applied in this disclosure is a multi-focal plane (MFP) stack. An MFP may be formed from a video plus depth format. MFPs may be used for (e.g., near-eye) displays supporting natural accommodation/focus.

An MFP stack may be formed by depth blending, reconstructing the captured scene with few focal planes at chosen distances. With this kind of quantization, the complexity of rendering (accommodative) 3D images may be reduced to a level which is better manageable with current displays and optics. An MFP stack may be formed by traditional linear depth blending (e.g., as described in Akeley, Kurt, et al. "A stereo display prototype with multiple focal distances." ACM transactions on graphics (TOG) 23.3 (2004): 804-813, which is herein incorporated by reference in its entirety). By rendering the focal planes, aligned in the viewing frustum at different distances, a perception for continuous depth may be supported.

Figure 2:
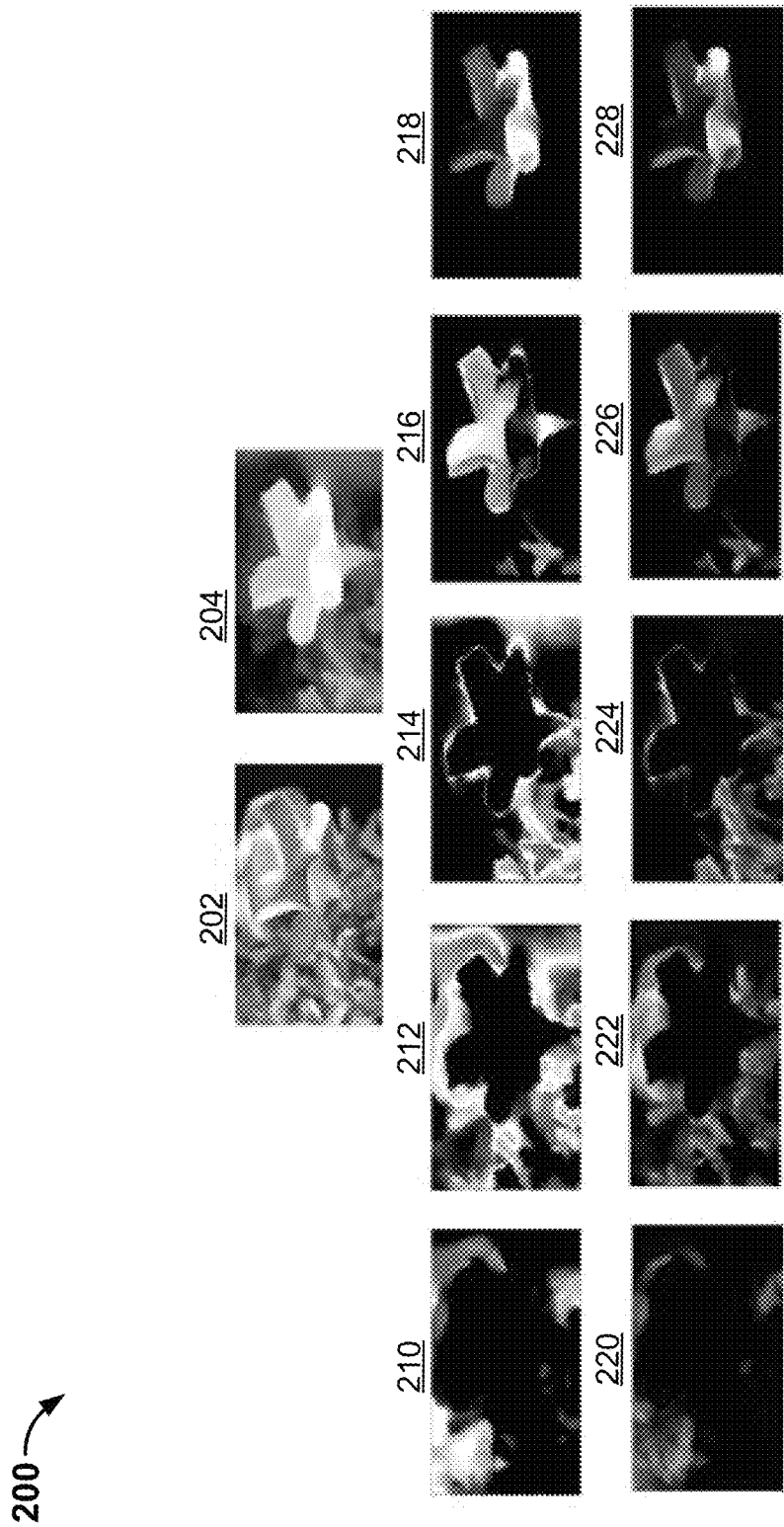
FIG. 2 shows an illustrative example of a texture image and its depth map being decomposed by depth blending, in accordance with some embodiments of this disclosure.

FIG. 2 shows an example 200 of a texture image 202 and its depth map 204. The depth map 204 may be decomposed by depth blending into five weight planes 210, 212, 214, 216, and 218. The five weight planes 210, 212, 214, 216, and 218 may be used for forming five MFPs 220, 222, 224, 226, and 228 by pixelwise multiplication with the texture image 202.

An MFP stack may be formed not for supporting accommodative rendering, but for supporting better inclusion of the depth dimension when coding video plus depth captures. In some embodiments, MFP representation may be used for adding a depth dependent MFP prediction (e.g., 3D-MFP prediction or MFP prediction) to predictions (e.g., 2D predictions, or any suitable prediction) in differential coding, which are formed using pixels (e.g., in blocks) of successive image frames, i.e., predictions in time dimension. Adding a depth dependent MFP prediction may have the advantage of enabling processing of specific portions of pixels in a corresponding depth frame for a better prediction (e.g., compensating for camera motion/viewpoint change) compared to another type of prediction processing of a group of image pixels in a 2D block (e.g., processing of pixels without using knowledge of their positions in the depth dimension).

The disclosed approach may improve predictions and efficiency in a predictive coding method by using 3D representations of coded (reconstructed) scenes. The basic coding structure and algorithmic operations may remain close to those in current 2D video coding methods, easing up the take-up of the approach.

The 3D representation of a reconstructed scene (or a volume) may be a stack of focal planes (MFPs), which may be used in approaches for supporting natural accommodation or focus when viewing 3D content (avoiding the sc. vergence-accommodation conflict, VAC, causing discomfort and nausea in normal stereoscopic viewing).

An MFP decomposition of a reconstructed image frame may be used to form a 3D prediction (referred to herein as an MFP prediction) for the new image (or block) to be coded. To do this, a mapping between the previous and the latest image frame may be derived by the encoder and sent to the decoder. Correspondingly, the improvement of coding efficiency may be best when capturing content by a moving camera.

The approach may be used for coding signals in video plus depth format and may be applied to improve corresponding coding approaches.

The use of MFP prediction in predictive coding may improve the coding efficiency of video-plus-depth type data during camera motion, by detecting the pose of the captured frame w.r.t (with reference to) the viewpoint of the previously coded frame (e.g., a frame may refer to a pair of video texture and depth map images).

The new relative viewpoint may be made in the encoder and transmitted to the receiver. This data is used in both terminals to form an identical 3D prediction of (a viewpoint to) the 3D representation of the previously coded (3D) scene. The 3D scene may be the latest textured depth map after coding, i.e., the scene surface defined by the latest reconstructed frame (texture and depth map).

The 3D scene may be presented in a specific format of a focal plane (MFP) stack. Forming MFP stacks may be based on the sc. depth blending and specific linear depth blending functions may be used (e.g., as described in Akeley). However, the depth blending functions may be any suitable set of weight functions fulfilling the basic property for partition of unity, which results with a set of MFPs, whose pixel luminances—after being split (blended) into MFPs using the depth map and aligned over each other—sum up back to the original image texture. In some embodiments, forming MFP stacks may be based on any suitable set of weight functions.

Figure 3:
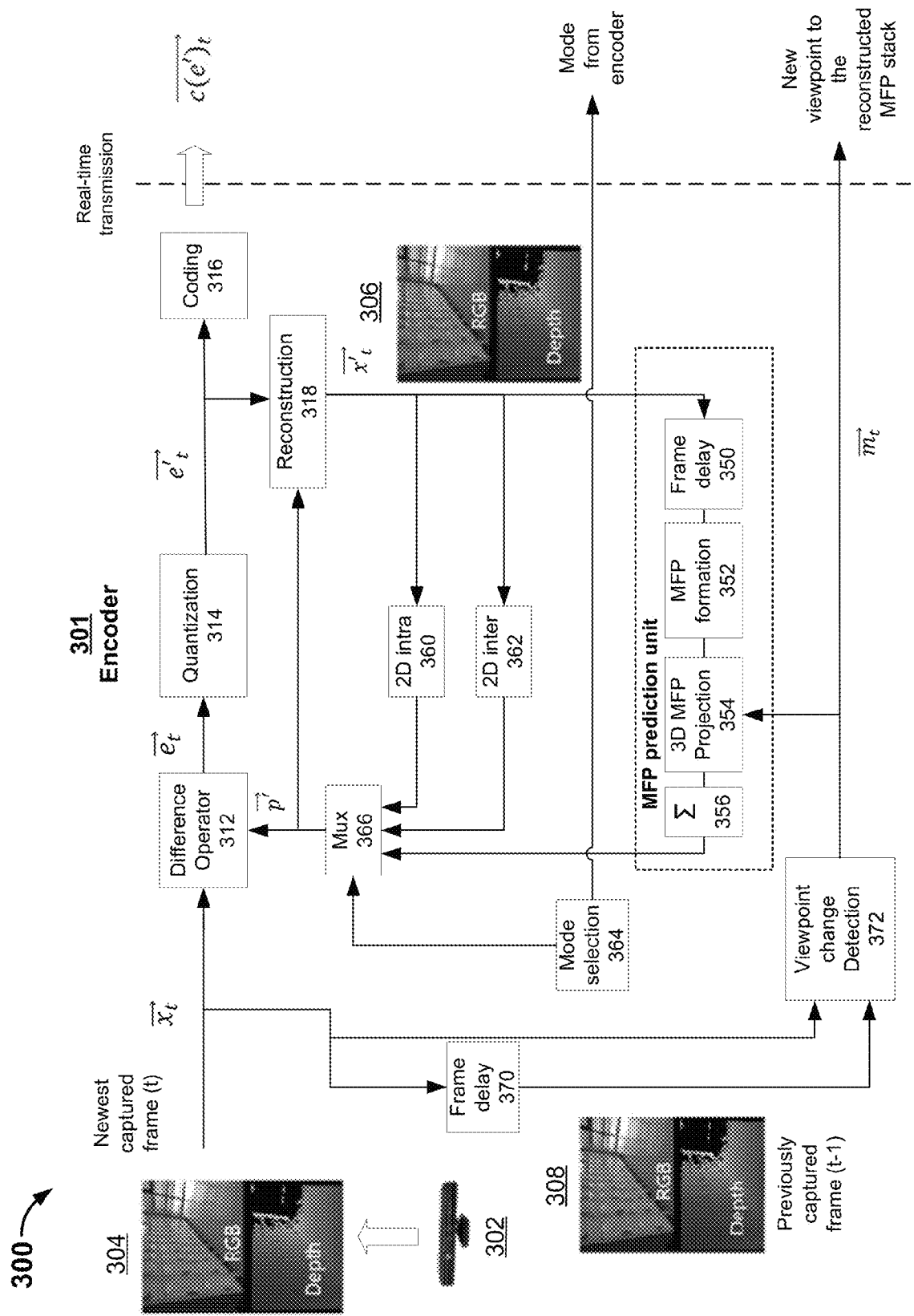
FIG. 3 shows an illustrative example of a schematic block diagram of adding MFP predictions to a predictive coding system, in accordance with some embodiments of this disclosure.

FIG. 3 shows an illustrative example of adding MFP predictions to a predictive coding system 300, in accordance with some embodiments of this disclosure. For simplicity, FIG. 3 depicts an encoder 301 (e.g., transmitter), but not a corresponding decoder (e.g., receiver). As illustrated earlier in FIG. 1, predictions (also the disclosed MFP prediction) may be made in an identical way in a decoder.

In some embodiments, the sensor device 302, newest captured frame (t) 304, difference operator block 312, quantization block 314, coding block 316, and the reconstruction block 318 of FIG. 3 correspond to (e.g., are similar to, the same as) the sensor device 102, new frame 104, difference operator block 112, quantization block 114, coding block 116, and the reconstruction block 118, respectively, of FIG. 1. In some embodiments, the coding block 316 is a channel coding block. In some embodiments, the group of blocks including the 2D intra block 360, the 2D inter block 362, the MFP prediction unit (e.g., summation block 356, 3D MFP Projection block 354, MFP formation block 352, and frame delay block 350), the mode selection block 364, the mux 366, frame delay block 370, and the viewpoint change detection block 372, of FIG. 3 may correspond to (e.g., is similar to, the same as) the prediction block 120 of FIG. 1.

The encoder 301 may receive the newest captured frame (t) 304 (e.g., $\vec{x}_t$) from sensor device 302 (e.g., a texture and depth sensor). In some embodiments, the encoder 301 includes a 2D intra block 360, 2D inter block 362, and an MFP prediction unit for providing different types of predictions. Although FIG. 3 shows specific types of prediction blocks (e.g., 2D intra and 2D inter blocks), in some embodiments, any suitable type of one or more prediction blocks may be used (e.g., 2D intra, 2D inter, or any suitable type of prediction block). The MFP prediction unit may include a frame delay block 350, MFP formation block 352, 3D MFP projection block 354, and summation block 356. In some embodiments, the 2D intra block 360 and the 2D inter block 362 may include a delay block (e.g., similar to, the same as the frame delay block 350). In some embodiments, the delay block outputs the input of the delay block after a delay, and the delay may be less than a frame delay. For example, the 2D intra block 360 may include a delay block with a delay less than a frame delay. The encoder 301 may include a mode selection block 364 and a mux 366 for selecting the best prediction and generating the mode (e.g., prediction mode, coding mode) from encoder. In some embodiments, the encoder 301 includes a frame delay block 370 and a viewpoint change detection block 372 for detecting a viewpoint change and generating a new viewpoint to the reconstructed MFP stack.

The input to the 2D intra block 360, 2D inter block 362, and the MFP prediction unit may be a reconstructed input frame (t) 306 (e.g., $\vec{x}'_t$) and the output of each of the blocks may be their respective predictions. For example, the 2D intra block 360 may generate a 2D intra prediction from the reconstructed input frame (t) 306 (e.g., $\vec{x}'_t$). For example, the 2D inter block 362 may generate a 2D inter prediction from the reconstructed input frame (t) (e.g., $\vec{x}'_t$). The reconstructed input frame (t) 306 (e.g., $\vec{x}'_t$) may be a sum of the output of quantization block 314 (quantized error $\vec{e}'_t$) and output of the mux 366 (selected prediction $\vec{p}'$). The reconstruction block 318 may add the quantized prediction error to the output of the mux 366 to generate the reconstructed frame. In some embodiments, the reconstructed frame is an image with quantization errors.

In some embodiments, the 2D intra block 360 generates a prediction using information from a current frame and not from previous frame(s). In some embodiments, the input to the 2D intra block 360 is a reconstructed current frame. For example, the 2D intra block 360 may generate a 2D intra prediction based on previously reconstructed pixels of the current frame. In some embodiments, the 2D intra block 360 generates a 2D intra prediction based on one or more reconstructed pixels of the current frame.

In some embodiments, the 2D inter block 362 generates a prediction using information from a current frame and one or more previous frames. In some embodiments, the input to the 2D inter block 362 is a reconstructed one or more previous frames (e.g., one or more reconstructed previous frames). In some embodiments, the 2D inter block generates a 2D inter prediction based on one or more reconstructed previous frames.

The predictions from the 2D intra block 360, 2D inter block 362, and the MFP prediction unit may be input into mux 366. A mode selection block 364 may determine, based on all prediction distortions and rates, which prediction to use. Although not shown for purposes of simplicity in the illustrated example, the mode selection block 364 may have as input the predictions output from 2D intra block 360, 2D inter block 362, the MFP prediction unit, and the newest captured frame (t) 304. The mode selection block 364 may compare the predictions to the newest captured frame (t) 304 to determine which prediction is best (e.g., based on prediction distortion and rates, prediction with smallest error). The mode selection block 364 may select the mode corresponding to the best prediction, and may output the mode to the mux 366 to select the best prediction. The encoder 301 may transmit the mode selection as the (prediction/coding) mode from the encoder in real-time transmission.

In some embodiments, the input to the mux 366 is the output of the mode selection block 364, and the output of the mux 366 is the selected prediction $\vec{p}'$, which is used in predictive coding of the newest captured frame (t) 304 (e.g., $\vec{x}_t$). The difference operator block 312 may subtract the selected prediction $\vec{p}'$ from the newest captured frame (t) 304 (e.g., $\vec{x}_t$) to produce the prediction error $\vec{e}_t$. The prediction error $\vec{e}_t$ may be quantized by the quantization block 314 (reduction of fidelity), and the quantization block 314 may output the quantized error $\vec{e}'_t$. The coding block 316 may code the quantized error $\vec{e}'_t$ and may output coded quantized error $\overrightarrow{c(e')}_t$. The encoder 301 (e.g., transmitter) may transmit the coded quantized error $\overrightarrow{c(e')}_t$ in real-time transmission.

The newest captured frame (t) 304 (e.g., $\vec{x}_t$) may be input into frame delay block 370. The output of the frame delay block 370 may be a previously captured frame (t-1) 308. As an example, the input of the frame delay block 370 may be the newest captured frame (t) 304, and the frame delay block 370 may output the newest captured frame (t) after a delay (e.g., previously captured frame (t-1)). In some embodiments, the frame delay block 370 may be implemented using a first-in first-out (FIFO) memory. The previously captured frame (t-1) 308 and newest captured frame (t) 302 (e.g., $\vec{x}_t$) may be input to the viewpoint change detection block 372 to detect a change in viewpoint. The viewpoint change detection block 372 detects a change in viewpoint and outputs the change in viewpoint $\vec{m}_t$. The viewpoint change detection block 372 may detect a change in viewpoint using any suitable method (e.g., using data from electronics for tracking motion, from video data, or some combination thereof), which is also described following the description the viewpoint change detection block 472 of FIG. 4. In some embodiments, the change in viewpoint is $\vec{m}_t$=(x,y,z,α,β,γ), referring to the three new coordinates and three shooting angles of the camera. In some embodiments, any suitable number of parameters may be used to describe the change in viewpoint. The change in viewpoint $\vec{m}_t$ may be output to the MFP prediction unit (e.g., 3D MFP projection block 354) to assist in producing the MFP prediction. The encoder 301 (e.g., transmitter) may transmit the change in viewpoint $\vec{m}_t$ as the new viewpoint to the reconstructed MFP stack in real-time transmission. The MFP prediction unit and its corresponding blocks is described in more detail in the description for FIGS. 4A and 4B.

Tracking and describing camera motion may be an efficient way of increasing coding efficiency. Using knowledge of camera motion, the disclosed approach may use the MFP decomposition of the previous reconstructed image to form a prediction to the new relative viewpoint deduced by the encoder (e.g., by shifting and/or scaling the focal planes w.r.t each other, and by summing pixels along the same optical axis). Example techniques relating to MFPs are described in S. T. Valli and P. K. Siltanen, "WO2019183211A1. Multi-focal Plane Based Method to Produce Stereoscopic Viewpoints in a DIBR System (MFP-DIBR)," Patent Application publication 2019 Sep. 26, which is herein incorporated by reference in its entirety.

In particular, the coding quality of the depth data from texture and depth cameras (e.g., current RGB-D cameras, etc.) may be inadequate. The MFP prediction mode may improve the coding efficiency of both video and depth data.

Making 3D Predictions using a Reconstructed MFP Stack

In predictive coding, a reconstructed frame may be the previous frame, which may be identically reconstructed (coded and decoded, i.e., including quantization/coding errors) both at the encoder and the decoder (transmitter and receiver). The reconstructed frame may be used as the basis of a set of identically formed predictions. When coding a block, the transmitter may choose the prediction it considers the best, and may send the corresponding coding mode selection (and coded differences thereto) to the receiver.

In the disclosed approach, both video and depth signals may be coded using a predictive coding scheme. For example, at each moment similar reconstructed (coded and decoded) texture and depth map images may be available at both terminals. The depth map may be used to decompose the texture image into identical sets of focal planes (MFPs) at both ends. Correspondingly, identical MFPs may be available for making a set of depth-based predictions, and thus for increasing the coding efficiency.

Using a Projection of a Reconstructed MFP Stack as a 3D Prediction

Often in video coding methods, the predictions may not get or use knowledge about the movements of the video camera. In the MFP prediction approach, camera movement may be detected and used for reducing data for transmission.

Capturing camera or sensor movements may be a routine for example in 3D reconstruction implementations (e.g., based on simultaneous localization and mapping (SLAM)), where a 3D model is built by recognizing and tracking camera poses w.r.t a 3D model being reconstructed.

In some embodiments, MFPs may be used for 3D prediction in a predictive coding method. For example, after a camera position is deduced in the encoder, coded, and sent to a decoder—a 3D prediction may be formed by projecting a reconstructed MFP stack to the derived camera position. The prediction may be a sum of processed (shifted and/or scaled) focal planes and is described in the following description relating to FIGS. 4A and 4B.

Figure 4A:
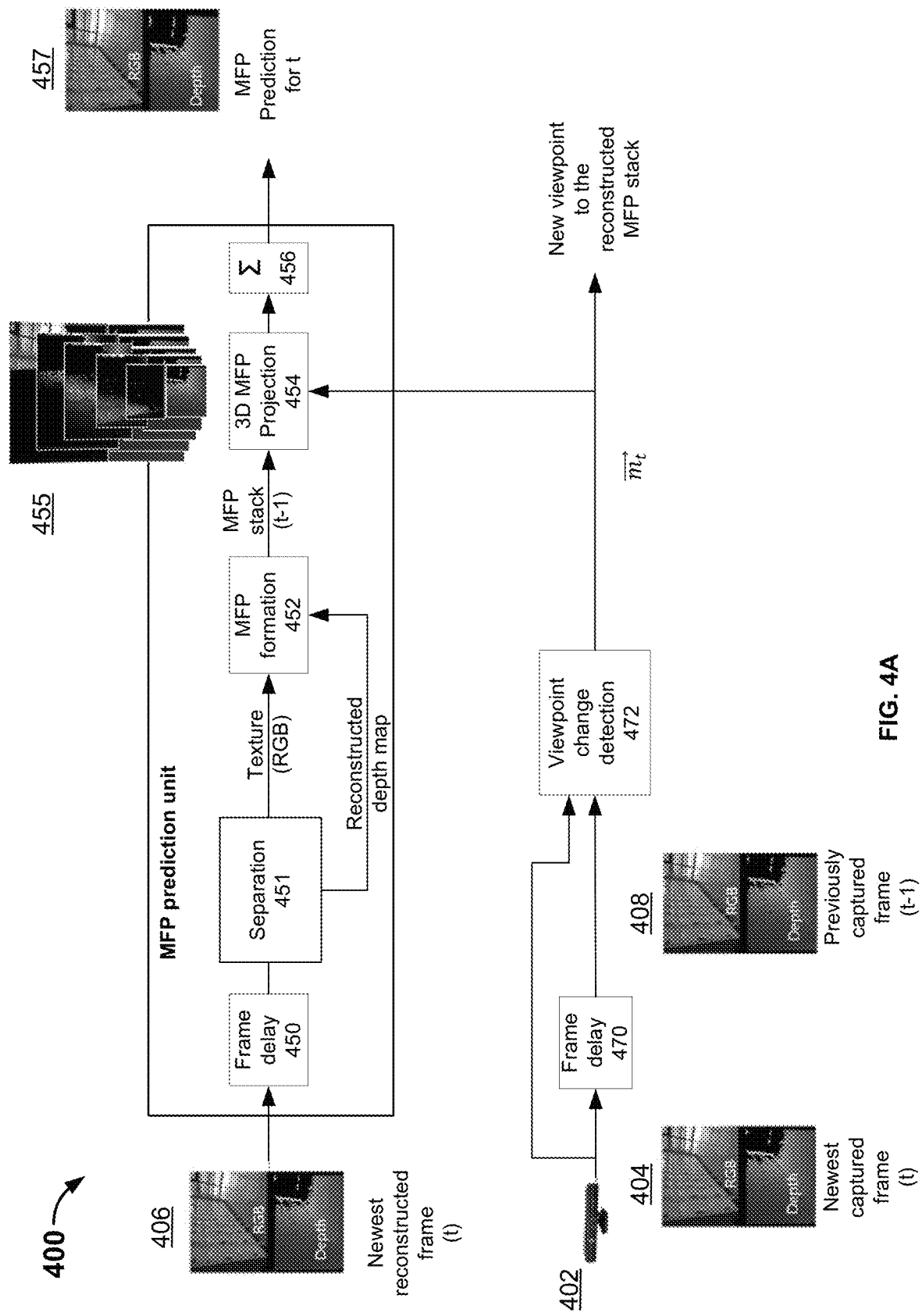
FIG. 4A shows an illustrative example of a schematic block diagram for forming an MFP based prediction by forming a viewpoint to an MFP stack, in accordance with some embodiments of this disclosure.

FIG. 4A is a schematic block diagram 400 for forming the MFP prediction (a part of the predictive coding loop in FIG. 3). The MFP prediction unit of FIG. 4A corresponds to (e.g., is the same as) the one shown in FIG. 3. The frame delay block 450, MFP formation block 452, 3D MFP projection block 454, and summation block 456 of FIG. 4A correspond to (e.g., is the same as) the frame delay block 350, MFP formation block 352, 3D MFP projection block 354, and summation block 356, respectively, of FIG. 3. The newest reconstructed frame (t) 406 of FIG. 4A corresponds to (e.g., is the same as) the reconstructed frame (t) 306 (e.g., $\vec{x}'_t$) of FIG. 3. The frame delay block 470 and viewpoint change detection block 472 of FIG. 4A correspond to (e.g., is the same as) the frame delay block 370 and viewpoint change detection block 372, respectively, of FIG. 3. The newest captured frame (t) 404 corresponds to (e.g., is the same as) the newest captured frame (t) 304. The previously captured frame (t-1) 408 corresponds to (e.g., is the same as) the previously captured frame (t-1) 308.

In some embodiments, the newest reconstructed frame (t) 406 is input to the MFP prediction unit (e.g., to the frame delay block 450). The frame delay block 450 may output a previous reconstructed frame (t-1). For example, the input of the frame delay block 450 may be the newest reconstructed frame (t) 406, and the frame delay block 450 may output the input of the block after a delay. In some embodiments, the frame delay block 450 may be implemented using a first-in, first-out (FIFO) memory. The previous reconstructed frame (t-1) may be input into a separation block 451. The separation block 451 separates an input frame into texture data and depth map data. The separation block 451 may output the previous reconstructed frame (t-1) into texture data and depth map data to be input to MFP formation block 452. The MFP formation block 452 may receive the separated texture data, and reconstructed depth map data of the previous reconstructed frame (t-1). In some embodiments, although not shown in FIG. 4A, the MFP formation block 452 may receive the previous reconstructed frame (t-1) and separate the previous reconstructed frame (t-1) data into separate texture data and depth map data.

The MFP formation block 452 decomposes a reconstructed previous frame to a plurality of focal planes. For example, the MFP formation block 452 decomposes the previous reconstructed frame (t-1) to the MFP stack (t-1). The MFP formation block 452 may output the MFP stack (t-1). The plurality of focal planes may be regularly spaced or irregularly spaced in distance. In some embodiments, the MFP formation block 452 may use the depth map data to decompose the texture data of the previous reconstructed frame (t-1) by depth blending.

The 3D MFP projection block 454 adjusts the plurality of focal planes from the previous camera viewpoint to correspond to or match with the current camera viewpoint. For example, the 3D MFP projection block 454 receives the MFP stack (t-1) and the change in viewpoint $\vec{m}_f$ as inputs. In some embodiments, the change in viewpoint is $\vec{m}_f = (x, y, z, \alpha, \beta, \gamma)$, referring to the three new coordinates and three shooting angles of the camera. In some embodiments, any suitable number of parameters may be used to describe the change in viewpoint. The 3D MFP projection block 454 may adjust the MFP stack (t-1), using the change in viewpoint as $\vec{m}_f$, to correspond to or match with the current camera viewpoint. FIG. 4A shows an example of an adjusted MFP stack 455. The 3D MFP projection block 454 may output the adjusted plurality of focal planes (e.g., adjusted MFP stack).

The summation block 456 may receive an adjusted MFP stack as an input. The summation block 456 sums the pixel values of the adjusted plurality of focal planes (adjusted MFP stack) along a plurality of optical axes from the current camera viewpoint. The plurality of optical axes may intersect a focal plane of the plurality of focal planes at a plurality of intersection points. In some embodiments, a distance between a first intersection point and a second intersection point of the plurality of intersection points may be less than a pixel spacing of an image corresponding to the focal plane. In some embodiments, the system may generate the MFP prediction by summing pixel values along each optical axis based on as many axes as there are pixels in an image corresponding to the focal plane. In some embodiments, the system may generate the MFP prediction by summing pixel values along optical axes corresponding to a portion of the pixels in an image corresponding to the focal plane (e.g., family of non-parallel lines going through the camera viewpoint and through a portion of the pixels in the image, such as skipping a neighboring pixel, etc.). The output of the summation block 456 may be an MFP prediction (e.g., an MFP prediction for t 457). The output of the MFP prediction unit may be an MFP prediction (e.g., an MFP prediction for t 457). In some embodiments, the MFP prediction may be for texture and depth data.

Figure 4B:
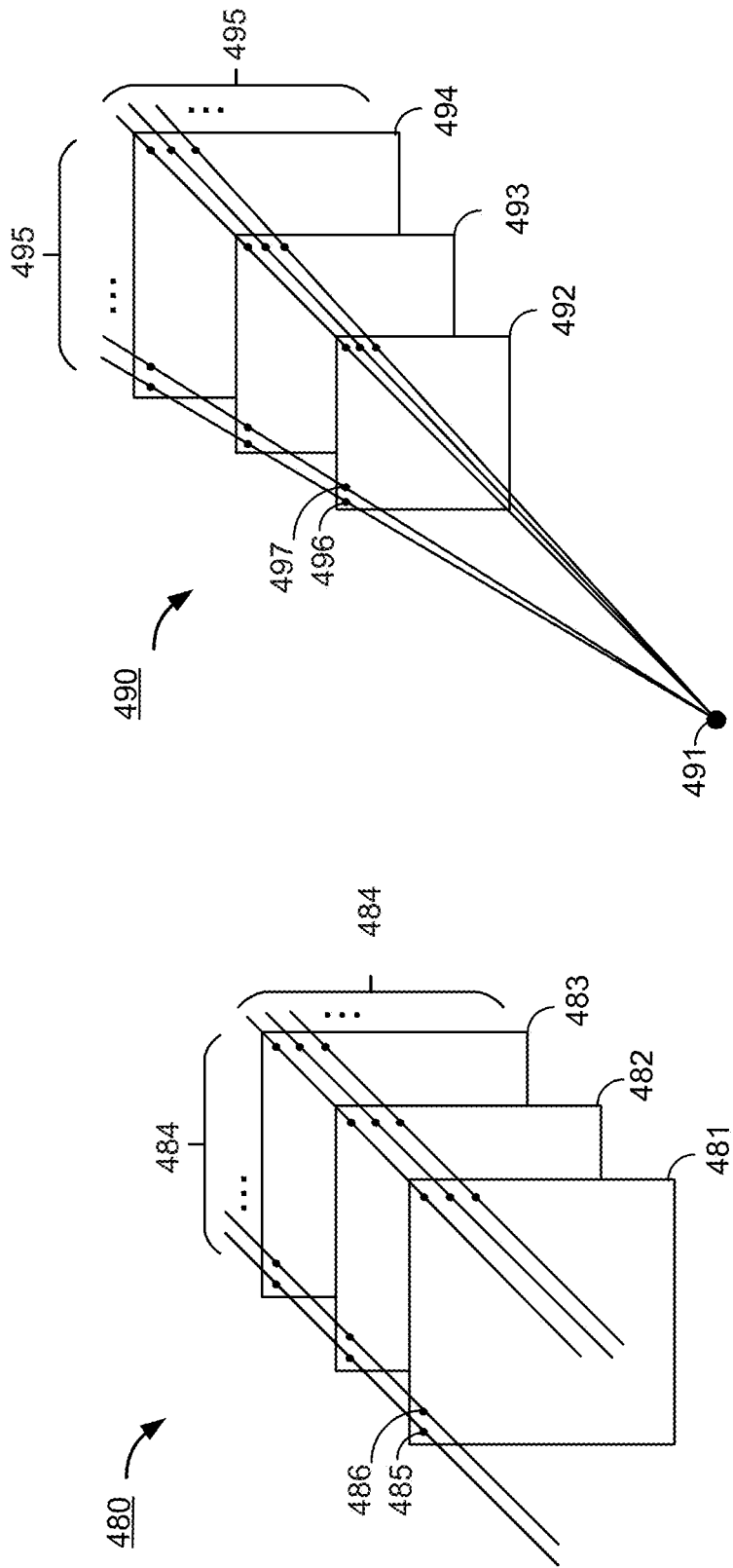
FIG. 4B shows illustrative examples for summing corresponding pixels in images, in accordance with some embodiments of this disclosure.

FIG. 4B shows illustrative examples for summing corresponding pixels in images, in accordance with some embodiments of this disclosure. FIG. 4B includes an example 480 for summing of corresponding pixels in images of the same size, and example 490 for summing of corresponding pixels in MFPs in a viewing frustum.

For illustrative purposes, example 480 shows summing of corresponding pixels in images of the same size (e.g., images 481, 482, and 483) along a same axis (e.g., each axis of the plurality of axes 484), with each axis intersecting a corresponding pixel in the images 481, 482, and 483. Example 480 shows a first intersection point 485 and second intersection point 486 on image 481. The first and second intersection points 485 and 486 may correspond to a first and second pixel of image 481. A distance between the first and second intersection points 485 and 486 may be a pixel spacing of the image. For example, data associated with first pixels of images 481, 482, and 483 may be summed along a first axis of the plurality of axes 484, and data associated with second pixels of images 481, 482, and 483 may be summed along a second axis of the plurality of axes 484 (etc.).

For illustrative purposes, example 490 shows summing of corresponding pixels in MFPs in a viewing frustum. An MFP stack may be a stack of image planes 492, 493, and 494 enlarging relative to a viewing frustum (e.g., of a pyramid starting from a camera (eye-point)). The plurality of optical axes (family of optical axes) starting from point 491 (e.g., camera (eye-point)) may intersect an image plane (e.g., focal plane, image plane 492, 493 or 494) of the plurality of image planes at a plurality of intersection points corresponding to each pixel in the image plane. Summing corresponding pixels in the image planes 492, 493, and 494 may be performed along each optical axis of the family of optical axes. Example 490 shows a first intersection point 496 and second intersection point 497 on image plane 492. The first and second intersection points 496 and 497 may correspond to a first and second pixel of image plane 492. A distance between the first and second intersection points 496 and 497 may be a pixel spacing of image plane 492. For example, data associated with first pixels of image planes 492, 493, and 494 may be summed along a first optical axis of the plurality of optical axes 495, and data associated with second pixels of image planes 492, 493, and 494 may be summed along a second axis of the plurality of axes 495. For simplicity, only three image planes are shown in FIG. 4B. In some embodiments, any suitable number of image planes may be used (e.g., 5, or any suitable number). For simplicity, in FIG. 4B, only a few axes or optical axes and corresponding intersection points are shown to represent a plurality of axes or optical axes and corresponding intersection points for each pixel in an image or image plane.

In some embodiments, any suitable number of image planes and any suitable number of optical axes may be used. In some embodiments, the family of optical axes may correspond to a portion of pixels in an image plane (e.g., a distance between first and second intersection points 496 and 497 may be greater than a pixel spacing). In some embodiments, the plurality of optical axes (family of optical axes) may correspond to any suitable number of optical axes. For example, a distance between first and second intersection points 496 and 497 may be less than a pixel spacing (e.g., more optical axes than pixels in an image plane). For example, a distance between first and second intersection points 496 and 497 may be greater than a pixel spacing (e.g., fewer optical axes than pixels in an image plane). In some embodiments, a pixel value may be interpolated at an intersection point in an image plane to determine a pixel value along an optical axis that does not intersect the image planes at a location corresponding to a pixel of the image plane (e.g., between pixel spacing, sub-pixel spacing), and the interpolated pixel value may be used for the summing of corresponding pixels along an optical axis. In some embodiments, corresponding intersection points for the plurality of optical axes with an image plane may be regularly spaced (e.g., intersection points corresponding to each pixel in an image plane, every other pixel, etc.). In some embodiments, corresponding intersection points for the plurality of optical axes with an image plane may be irregularly spaced (e.g., distance between neighboring intersection points may vary).

In some embodiments, the sensor device 402 is the same as sensor device 302. The frame delay 470 may receive the newest captured frames (t) 404 from sensor device 402 (e.g., a texture and depth sensor). The newest captured frame (t) 404 may be input into frame delay block 470. The output of the frame delay block 470 may be the previously captured frame (t-1) 408. In some embodiments, the frame delay block 470 may be similar to (e.g., the same as) the frame delay block 450. In some embodiments, the frame delay block 470 may be implemented using a first-in, first-out (FIFO) memory. The previously captured frame (t-1) 408 may be input into the viewpoint change detection block 472. The viewpoint change detection block 472 detects a change in viewpoint and outputs the change in viewpoint $\vec{m}_t$. For example, the change in viewpoint may be $\vec{m}_t=(x,y,z,\alpha,\beta,\gamma)$ referring to the three new coordinates and three shooting angles of the camera. The viewpoint change detection block 472 may detect the change in viewpoint using data from electronics for tracking motion, from video data, or some combination thereof. The change in viewpoint $\vec{m}_t$ may be output to the MFP prediction unit (e.g., 3D MFP projection block 454) to assist in producing the MFP prediction. The encoder (e.g., transmitter) may transmit the change in viewpoint $\vec{m}_t$ as the new viewpoint to the reconstructed MFP stack in real-time transmission.

The MFP prediction may work well with a moving camera or sensor, which may have embedded electronics for tracking motion (e.g., an inertial motion unit, IMU, or a like). In some embodiments, the viewpoint may be deduced using video information, i.e., without having knowledge about the camera motion (e.g., IMU readings), but deriving the motion from changes in the content geometrics (e.g., as described in Gauglitz, Steffen, Tobias Hollerer, and Matthew Turk. "Evaluation of interest point detectors and feature descriptors for visual tracking." International journal of computer vision 94.3 (2011): 335-360, which is herein incorporated by reference in its entirety). Comparison may be made between uncoded (undistorted) video frames, as the viewpoint may be sent to the decoder and not e.g., predicted or formed using previously coded information.

In some embodiments, the disclosed approach uses the relative motion between consecutive frames (e.g., not a global reference or coordinate system). For example, the system may use the relative motion without reconstructing a 3D model of the captured space.

In some embodiments, the relative motion between consecutive frames may be described by six parameters. For example, the camera motion in FIG. 5 may be expressed as $\vec{m}_t=(x,y,z,\alpha,\beta,\gamma)$), and FIGS. 3 and 4A may describe the change in viewpoint as $\vec{m}_t$, for example as represented by six parameters, $\vec{m}_t=(x,y,z,\alpha,\beta,\gamma)$. The use of six parameters may be compared to the classical six degrees of freedom (6DoF) for motion description, and may describe a pinhole camera model with no intrinsic camera parameters. In some embodiments, any suitable number of parameters may be used to describe the camera motion (e.g., 7, 8, 9, or any suitable number of parameters). Describing mappings (motion) between two consecutive images may reduce the information used to represent each image pixel. Thus, describing camera motion may be an efficient way to reduce data to be transmitted.

In some embodiments, the system may use various approaches and approximations to derive and track the parameters using captures by a moving camera (e.g., Jonchery, Claire, Francoise Dibos, and Georges Koepfler. "Camera motion estimation through planar deformation determination." Journal of Mathematical Imaging and Vision 32.1 (2008): 73-87, which is herein incorporated by reference in its entirety). In some embodiments, electronic sensors (e.g. IMUs or a similar device) may be used to ease up and improve the tracking.

Synthesizing New Viewpoints using an MFP Stack

Figure 5:
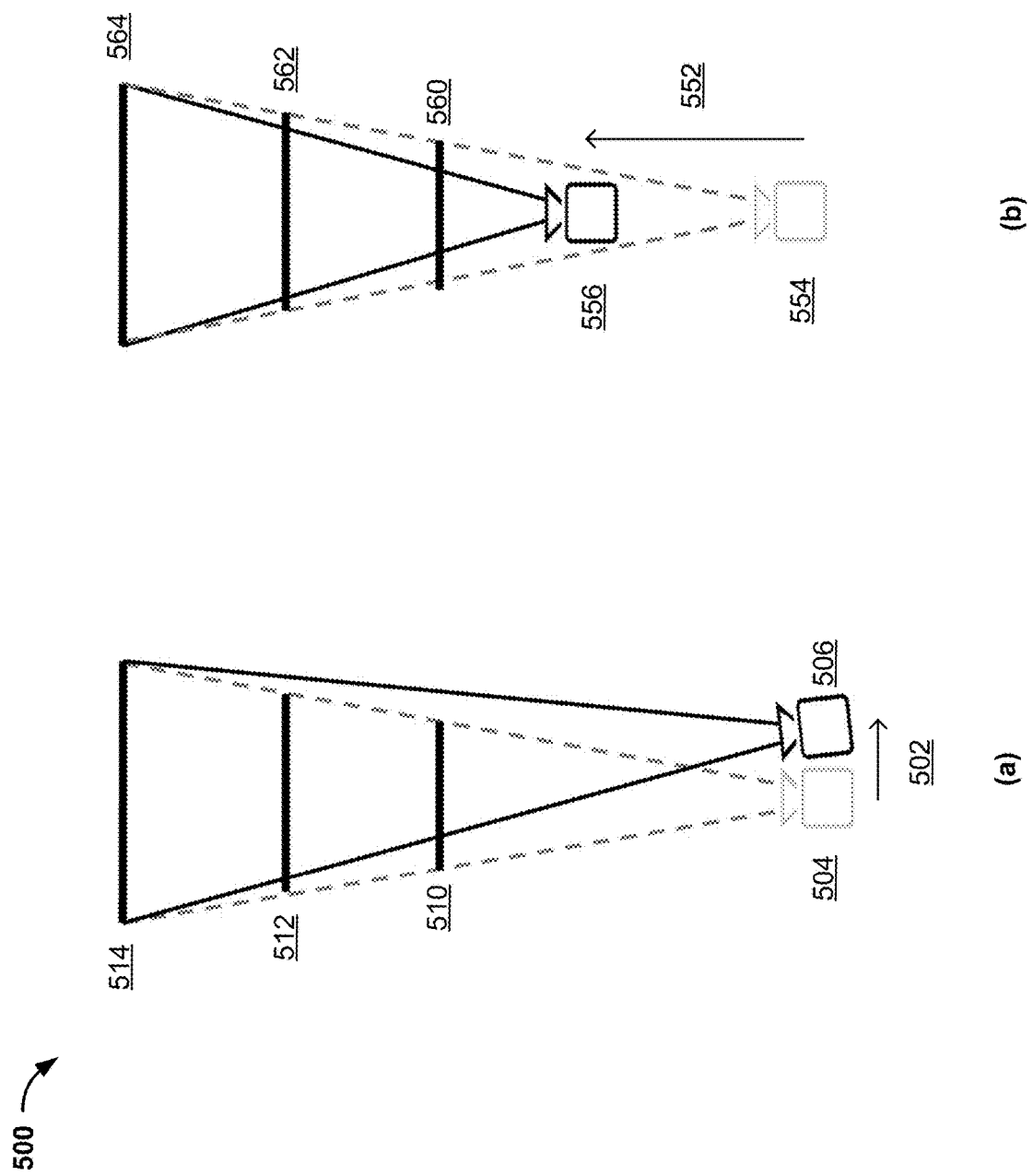
FIG. 5 shows an illustrative example of viewpoint changes to an MFP stack, in accordance with some embodiments of this disclosure.

FIG. 5 illustrates how viewpoint changes 500 to an MFP rendering show up to the viewer as shifting and scaling of focal planes. For example, a viewpoint change from a location different than the capture point may result in the MFPs appearing shifted and/or scaled. The viewpoint change shown in FIG. 5 (*a*) is a sideways change 502 (may also be interpreted as a stereoscopic viewpoint). The viewpoint change shown in FIG. 5 (*b*) is an axial change 552 (e.g., by moving closer to the MFP rendering). The 3D motion parallax may be perceived without a viewer moving by shifting and scaling MFPs correspondingly, (which may be seen, e.g., by comparing MFP dimensions to the dashed outline of each viewing frustum). For example, the geometry of the MFPs may be defined by the capture camera's frustum and the MFPs distances from the capture point. In FIG. 5, the capture point may be between the two (e.g., stereoscopic) viewpoints.

In FIG. 5 (*a*), transversal motions 502 to the right (e.g., a position of camera 504 moved to a position of camera 506) may be simulated by shifting focal planes 510, 512, and 514 to the left. The closest focal plane 510 may be shifted most and the furthest focal plane 514 may not be shifted at all (e.g., may be considered to reside far and not show any motion parallax). The amount of shift may be inversely dependent of the distance and may be calculated using arithmetic.

In the same way, axial motions may be simulated by scaling focal planes larger or smaller. In FIG. 5 (*b*), the motion 552 is illustrated towards the MFP rendering. For example, a camera's position 554 moved to a position 556 of FIG. 5 (*b*) may have moved towards the MFP rendering by motion 552. In this example, all focal planes except the furthest focal plane may be scaled larger. For example, focal planes 560 and 562 may be scaled larger, while focal plane 564 is not scaled larger (e.g., not scaled at all). The amount of scaling may depend on the viewing distance.

Figure 6:
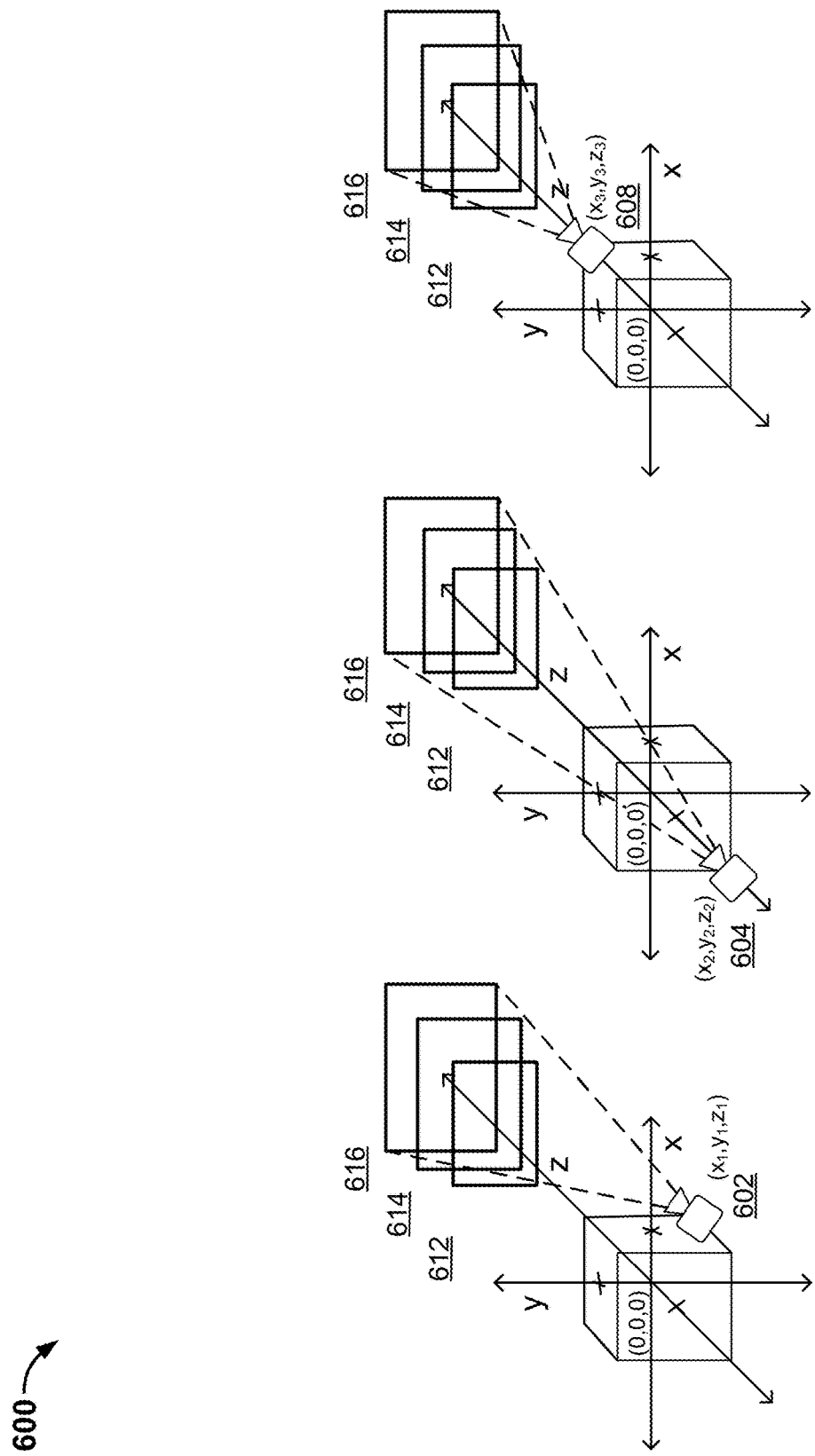
FIG. 6 shows an illustrative example of synthesizing camera viewpoints by shifting and scaling focal planes, in accordance with some embodiments of this disclosure.

FIG. 6 shows an illustrative example 600 of synthesizing camera viewpoints by shifting and scaling focal planes, in accordance with some embodiments of this disclosure. FIG. 6 shows an exemplary bounding box for supported 3D camera movements. FIG. 6 illustrates how a camera's detected position (e.g., 602, 604, and 608) is used to form a 3D prediction. Due to the camera motion, an existing (reconstructed) MFP stack will be seen from a different angle, indicated by the dashed viewing frustum(s). Seeing an MFP stack from a new camera viewpoint corresponds shifting and scaling MFPs w.r.t the viewpoint. For example, the effect of 3D camera movement may be implemented by shifting and scaling reconstructed focal planes 612 and 614 (note that the position and size for the furthest plane 616 is considered fixed). For example, a camera moving from the origin (0,0,0) to position 602 ($x_1$, $y_1$, $z_1$) corresponds to the reconstructed focal planes 612 and 614 moving left and up, and being scaled up (the latter due to camera moving closer). For example, a camera moving from the origin (0, 0, 0) to position 604 ($x_2$, $y_2$, $z_2$) corresponds to the reconstructed focal planes 612 and 614 moving right and up, and being scaled down (the latter due to camera moving further). For example, the 3D camera movement from the origin (0, 0, 0) to position 608 ($x_3$, $y_3$, $z_3$) corresponds to the reconstructed focal planes 612 and 614 moving left and down, and being scaled up (the latter due to camera moving closer).

In some embodiments, additional parameters may be used for describing the shift in camera view. In some embodiments, a nominal framerate may be maintained by adjusting coding quality, i.e., quantizing signals more heavily for low bitrates, or skipping frames to meet reductions in the network capacity. The system (e.g., encoder) may determine to skip frames based on the available network capacity (e.g., feedback from the network), based on the data and/or processing load of the receiver (e.g., feedback from receiver). In some embodiments, the system may include an adjustable delay before the viewpoint change detection block (e.g., FIG. 3, FIG. 4A, FIG. 12, and FIG. 14). The adjustable delay may be based on quantization accuracy in coding based on feedback from a status of the communication network or a status of the receiver over the communication network.

Skipping frames may reflect the amount of motion detected between the compared frames. The amount and quality of warping the viewpoint may be affected by the number and properties of the focal planes (i.e. allocation of contents/objects in depth) and may benefit from higher framerates. In some embodiments, a five MFP stack is used, but any suitable number MFP stack may be used. For example, a five MFP stack may support tracking of moderate camera movements at normal frame rates.

Figure 7:
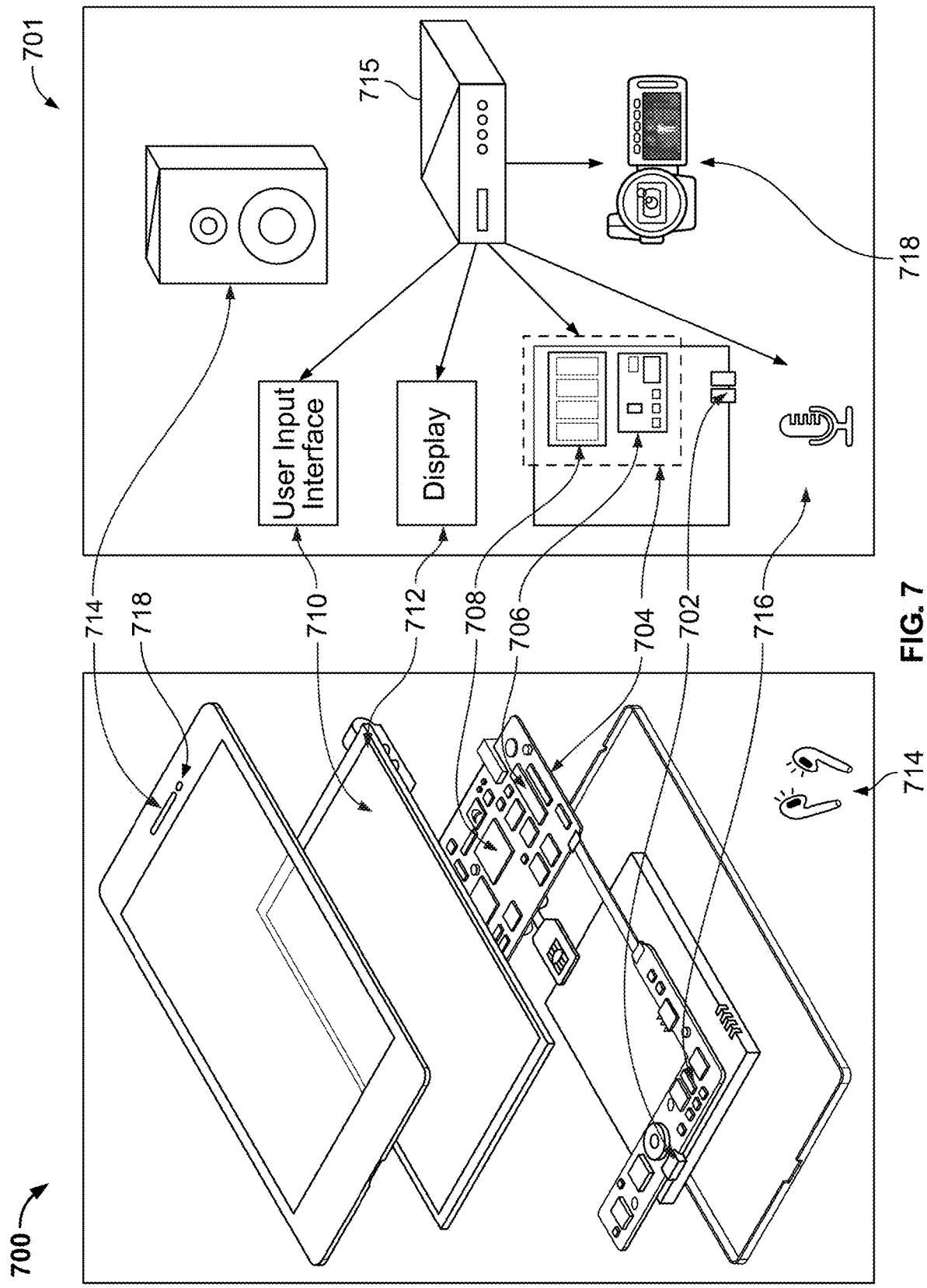
FIG. 7 shows an illustrative user equipment device, in accordance with some embodiments of this disclosure.
Figure 8:
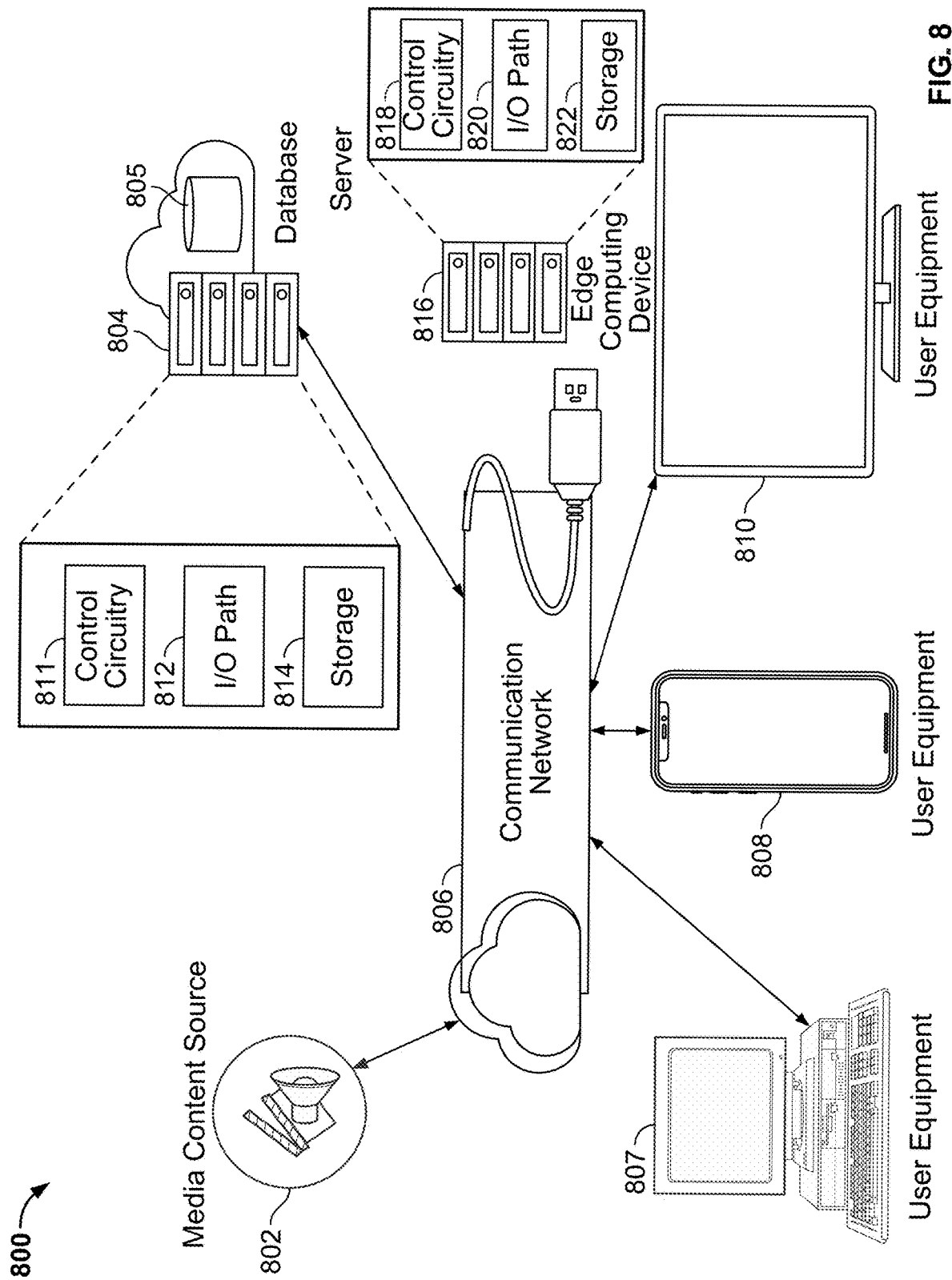
FIG. 8 shows an example system, in accordance with some embodiments of this disclosure.

FIGS. 7-8 depict illustrative devices, systems, servers, and related hardware for use of an MFP and/or MDP prediction in predictive coding. FIG. 7 shows generalized embodiments of illustrative user equipment devices 700 and 701. For example, user equipment device 700 may be a smartphone device, a tablet, a virtual reality or augmented reality device, or any other suitable device capable of processing video data. In another example, user equipment device 701 may be a user television equipment system or device. User television equipment device 701 may include set-top box 715. Set-top box 715 may be communicatively connected to microphone 716, audio output equipment (e.g., speaker or headphones 714), and display 712. In some embodiments, display 712 may be a television display or a computer display. In some embodiments, set-top box 715 may be communicatively connected to user input interface 710. In some embodiments, user input interface 710 may be a remote-control device. Set-top box 715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 700 and user equipment device 701 may receive content and data via input/output (I/O) path (e.g., circuitry) 702. I/O path 702 may provide content (e.g., broadcast programming, on-demand programming, Internet content, content available over a local area network (LAN) or wide area network (WAN), and/or other content) and data to control circuitry 704, which may comprise processing circuitry 706 and storage 708. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing. While set-top box 715 is shown in FIG. 7 for illustration, any suitable computing device having processing circuitry, control circuitry, and storage may be used in accordance with the present disclosure. For example, set-top box 715 may be replaced by, or complemented by, a personal computer (e.g., a notebook, a laptop, a desktop), a smartphone (e.g., device 700), a tablet, a network-based server hosting a user-accessible client device, a non-user-owned device, any other suitable device, or any combination thereof.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the codec application stored in memory (e.g., storage 708). Specifically, control circuitry 704 may be instructed by the codec application to perform the functions discussed above and below. In some implementations, processing or actions performed by control circuitry 704 may be based on instructions received from the codec application.

In client/server-based embodiments, control circuitry 704 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 7, the instructions may be stored in storage 708, and executed by control circuitry 704 of a device 700.

In some embodiments, the codec application may be a client/server application where only the client application resides on device 700, and a server application resides on an external server (e.g., server 804 and/or server 816). For example, the codec application may be implemented partially as a client application on control circuitry 704 of device 700 and partially on server 804 as a server application running on control circuitry 811. Server 804 may be a part of a local area network with one or more of devices 700 or may be part of a cloud computing environment accessed via the internet. In a cloud computing environment, various types of computing services for performing searches on the internet or informational databases, providing use of an MFP and/or MDP prediction in predictive coding capabilities, providing storage (e.g., for a database) or parsing data (e.g., using machine learning algorithms) are provided by a collection of network-accessible computing and storage resources (e.g., server 804 and/or edge computing device 816), referred to as "the cloud." Device 700 may be a cloud client that relies on the cloud computing capabilities from server 804 to determine whether processing (e.g., at least a portion of virtual background processing and/or at least a portion of other processing tasks) should be offloaded from the mobile device, and facilitate such offloading. When executed by control circuitry of server 804 or 816, the codec application may instruct control circuitry 811 or 818 to perform processing tasks for the client device and facilitate the use of an MFP and/or MDP prediction in predictive coding.

Control circuitry 704 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as codec application data described above. Nonvolatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of user equipment 700. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive video data for use of an MFP and/or MDP prediction in predictive coding. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

Control circuitry 704 may receive instruction from a user by way of user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment device 701. For example, display 712 may be a touchscreen or touch-sensitive display. In such circumstances, user input interface 710 may be integrated with or combined with display 712. In some embodiments, user input interface 710 includes a remote-control device having one or more microphones, buttons, keypads, any other components configured to receive user input or combinations thereof. For example, user input interface 710 may include a handheld remote-control device having an alphanumeric keypad and option buttons. In a further example, user input interface 710 may include a handheld remote-control device having a microphone and control circuitry configured to receive and identify voice commands and transmit information to set-top box 715.

Audio output equipment 714 may be integrated with or combined with display 712. Display 712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Audio output equipment 714 may be provided as integrated with other elements of each one of device 700 and equipment 701 or may be stand-alone units. An audio component of videos and other content displayed on display 712 may be played through speakers (or headphones) of audio output equipment 714. In some embodiments, audio may be distributed to a receiver (not shown), which processes and outputs the audio via speakers of audio output equipment 714. In some embodiments, for example, control circuitry 704 is configured to provide audio cues to a user, or other audio feedback to a user, using speakers of audio output equipment 714. There may be a separate microphone 716 or audio output equipment 714 may include a microphone configured to receive audio input such as voice commands or speech. For example, a user may speak letters or words that are received by the microphone and converted to text by control circuitry 704. In a further example, a user may voice commands that are received by a microphone and recognized by control circuitry 704. Camera 718 may be any suitable video camera integrated with the equipment or externally connected. Camera 718 may be a digital camera comprising a charge-coupled device (CCD) and/or a complementary metal-oxide semiconductor (CMOS) image sensor. Camera 718 may be an analog camera that converts to digital images via a video card.

The codec application may be implemented using any suitable architecture. For example, it may be a stand-alone application wholly-implemented on each one of user equipment device 700 and user equipment device 701. In such an approach, instructions of the application may be stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to provide for use of an MFP and/or MDP prediction in predictive coding functionality and perform any of the actions discussed herein. Based on the processed instructions, control circuitry 704 may determine what action to perform when input is received from user input interface 710. For example, movement of a cursor on a display up/down may be indicated by the processed instructions when user input interface 710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 700 and user equipment device 701 may be retrieved on-demand by issuing requests to a server remote to each one of user equipment device 700 and user equipment device 701. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on device 700. This way, the processing of the instructions is performed remotely by the server while the resulting displays (e.g., that may include text, a keyboard, or other visuals) are provided locally on device 700. Device 700 may receive inputs from the user via input interface 710 and transmit those inputs to the remote server for processing and generating the corresponding displays. For example, device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to device 700 for presentation to the user.

In some embodiments, the codec application may be downloaded and interpreted or otherwise run by an interpreter or virtual machine (run by control circuitry 704). In some embodiments, the codec application may be encoded in the ETV Binary Interchange Format (EBIF), received by control circuitry 704 as part of a suitable feed, and interpreted by a user agent running on control circuitry 704. For example, the codec application may be an EBIF application. In some embodiments, the codec application may be defined by a series of JAVA-based files that are received and run by a local virtual machine or other suitable middleware executed by control circuitry 704. In some of such embodiments (e.g., those employing MPEG-2 or other digital media encoding schemes), codec application may be, for example, encoded and transmitted in an MPEG-2 object carousel with the MPEG audio and video packets of a program.

FIG. 8 is a diagram of an illustrative system 800 for utilizing an MFP and/or MDP prediction in predictive coding, in accordance with some embodiments of this disclosure. User equipment devices 807, 808, 810 (e.g., which may correspond to one or more of computing device 212 may be coupled to communication network 806). Communication network 806 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 806.

System 800 may comprise media content source 802, one or more servers 804, and one or more edge computing devices 816 (e.g., included as part of an edge computing system). In some embodiments, the codec application may be executed at one or more of control circuitry 811 of server 804 (and/or control circuitry of user equipment devices 807, 808, 810 and/or control circuitry 818 of edge computing device 816). In some embodiments, data may be stored at database 805 maintained at or otherwise associated with server 804, and/or at storage 822 and/or at storage of one or more of user equipment devices 807, 808, 810.

In some embodiments, server 804 may include control circuitry 811 and storage 814 (e.g., RAM, ROM, Hard Disk, Removable Disk, etc.). Storage 814 may store one or more databases. Server 804 may also include an input/output path 812. I/O path 812 may provide data for use of an MFP and/or MDP prediction in predictive coding, device information, or other data, over a local area network (LAN) or wide area network (WAN), and/or other content and data to control circuitry 811, which may include processing circuitry, and storage 814. Control circuitry 811 may be used to send and receive commands, requests, and other suitable data using I/O path 812, which may comprise I/O circuitry. I/O path 812 may connect control circuitry 811 (and specifically control circuitry) to one or more communications paths.

Control circuitry 811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 811 executes instructions for an emulation system application stored in memory (e.g., the storage 814). Memory may be an electronic storage device provided as storage 814 that is part of control circuitry 811.

Edge computing device 816 may comprise control circuitry 818, I/O path 820, and storage 822, which may be implemented in a similar manner as control circuitry 811, I/O path 812, and storage 824, respectively of server 804. Edge computing device 816 may be configured to be in communication with one or more of user equipment devices 807, 808, 810 and server 804 over communication network 806, and may be configured to perform processing tasks (e.g., for use of an MFP and/or MDP prediction in predictive coding) in connection with ongoing processing of video data. In some embodiments, a plurality of edge computing devices 816 may be strategically located at various geographic locations, and may be mobile edge computing devices configured to provide processing support for mobile devices at various geographical regions.

Figure 9:
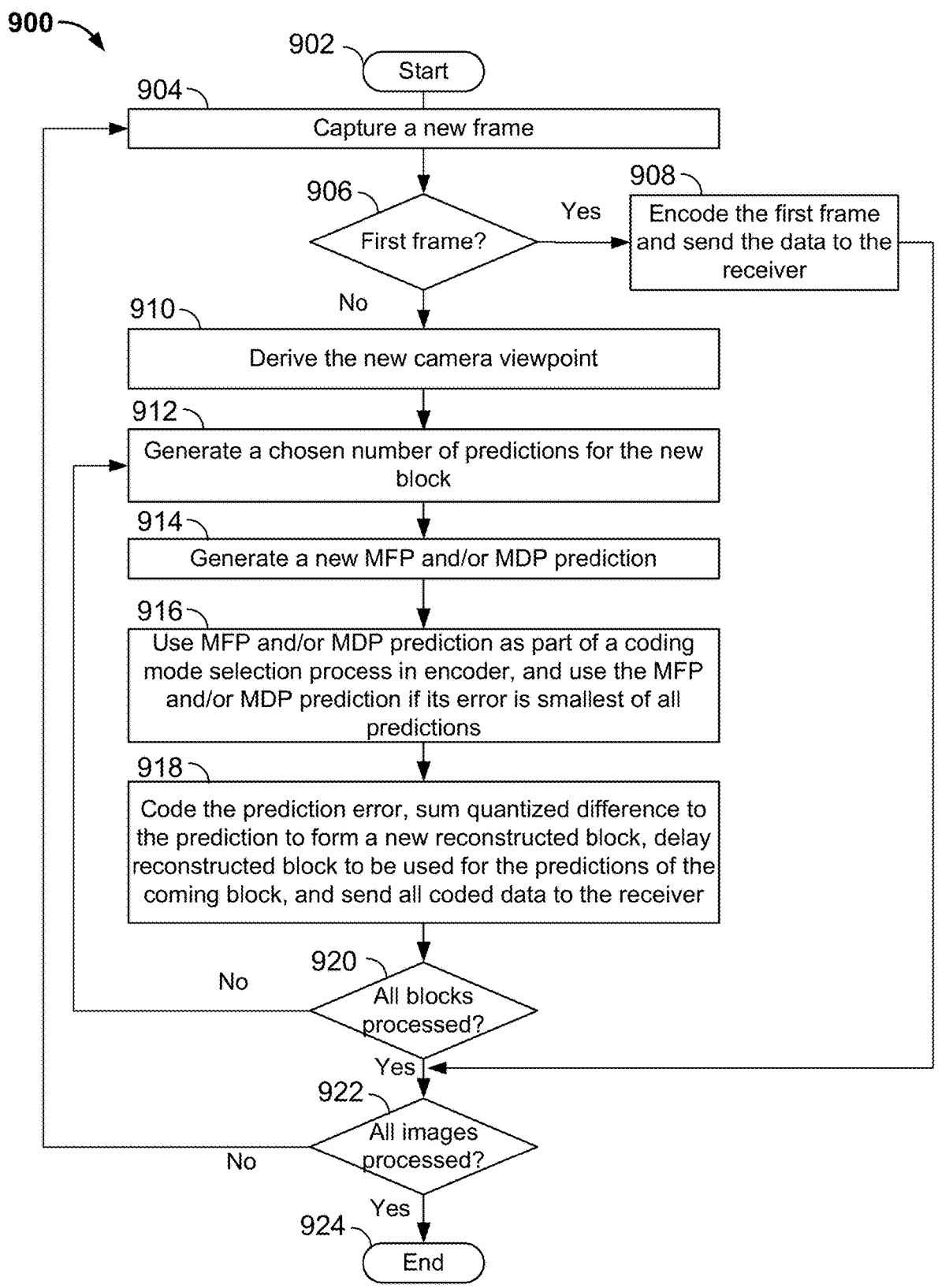
FIG. 9 is a flowchart of a detailed illustrative process for viewpoint detection and predictive coding using an MFP prediction, in accordance with some embodiments of this disclosure.

FIG. 9 is a flowchart of a detailed illustrative process 900 for viewpoint detection and predictive coding using an MFP and/or MDP prediction, in accordance with some embodiments of this disclosure. The above referred delay adjustment/frame skipping is not included in the flowchart for purposes of simplicity, but such techniques may be utilized in the flowchart of FIG. 9.

In various embodiments, the individual steps of process 900 may be implemented by one or more components of the devices and systems of FIGS. 1, 3, 4A, 7, 8, 12, and 14. Although the present disclosure may describe certain steps of process 900 (and of other processes described herein) as being implemented by certain components of the devices and systems of FIGS. 1, 3, 4A, 7, 8, 12, and 14 this is for purposes of illustration only, and it should be understood that other components of the devices and systems of FIGS. 1, 3, 4A, 7, 8, 12, and 14 may implement those steps instead.

At step 902, the control circuitry (e.g., control circuitry 811, control circuitry 818, or control circuitry of any of devices 807, 808, or 810) starts the viewpoint detection for the new frame. At step 904, the control circuitry captures a new frame. For example, the control circuitry may capture a new frame (texture and depth map, 4) using a texture and depth camera (e.g., RGB-D camera, etc.). Here, for simplicity, the new frame (texture and depth map, 4) is considered to include both texture and depth map data for a view. In some embodiments, the new frame may be split into texture data and depth map data and separately processed.

At step 906, the control circuitry determines if the captured new frame is a first frame. If the captured new frame is a first frame, at step 906, the process continues to step 908 where the control circuitry encodes the first frame (e.g., by DCT) and sends the data to the receiver, and then proceeds to step 922 to determine if all images have been processed. In some embodiments, the first frame may be split into texture data and depth map data, and the control circuitry may separately encode the texture data and the depth map data to be sent to the receiver, and then proceeds to step 922 to determine if all images have been processed. In some embodiments, the control circuitry encoding the first frame may mean the control circuitry quantizing and coding the first frame. In some embodiments, the control circuitry encoding the first frame may mean control circuitry separately quantizing and coding texture data and depth map data of the first frame to be sent to the receiver. If the captured new frame is not a first frame, the control circuitry proceeds to step 910 where the control circuitry derives the new camera viewpoint. For example, the control circuitry uses the new frame $\vec{x}_t$ and the previous (coded, decoded and delayed, i.e., reconstructed) frame $\vec{x'}_t$ to derive the new camera viewpoint $\vec{m}_t$ w.r.t the previous camera viewpoint. In some embodiments, the viewpoint detection/tracking may use position sensors in the texture and depth camera, along with the new frame and previous (reconstructed) frame, to assist in deriving the new camera viewpoint $(\vec{m}_t)$ w.r.t the previous camera viewpoint. In some embodiments, the viewpoint tracking may use position sensors in the texture and depth camera to derive the new camera viewpoint w.r.t the previous camera viewpoint. After step 910, the control circuitry ends viewpoint detection for the new frame and starts predictive coding of the new frame.

At step 912, the control circuitry generates a chosen number of (inter and/or intra) predictions for the new block using the previous reconstructed block $\vec{x'}_t$. In some embodiments, the previous reconstructed block is separately reconstructed texture data and depth map data.

At step 914, the control circuitry generates an MFP and/or MDP prediction. In some embodiments, the control circuitry generates a new MFP prediction by using the reconstructed texture and depth map image $(\vec{x'}_t)$ to decompose $\vec{x'}_t$ to a chosen number of focal planes (an MFP stack), shifting and scaling focal planes to correspond to or match with the new camera viewpoint $\vec{m}_t$, and summing focal plane pixel values along each optical axis from the new viewpoint. In some embodiments, the control circuitry separately generates a new MDP prediction and a new MFP prediction. In some embodiments, the control circuitry generates a new MDP prediction by using a reconstructed depth map to decompose the depth map to a chosen number of depth planes, shifting and scaling the depth maps to correspond to or match with the new camera viewpoint, and summing depth map pixel values along each optical axis from the new viewpoint. In some embodiments, the control circuitry generates a new MFP prediction by using the reconstructed texture data and reconstructed depth map data to decompose the reconstructed texture data image to a chosen number of focal planes (an MFP stack), shifting and scaling focal planes to correspond to or match with the new camera viewpoint, and summing focal plane pixel values along each optical axis from the new viewpoint. In some embodiments, the control circuitry separately generates a new MFP prediction for texture data of a frame based on separately generated reconstructed depth map and reconstructed texture data from a previous frame, which is used in predictive coding for the texture data (e.g., video).

At step 916, the control circuitry uses MFP and/or MDP prediction as part of a coding mode selection process in encoder, and uses the MFP and/or MDP prediction if its error (and rate) is smallest of all predictions. In some embodiments, the control circuitry separately generates the MFP prediction for texture data and the MDP prediction for depth map data, and uses the MFP and the MDP prediction if a sum of the errors of the MFP prediction and the MDP prediction to the texture data and depth map data of the current frame is the smallest of all predictions. In some embodiments, the control circuitry separately generates a new MFP prediction for texture data of a frame based on separately generated reconstructed depth map and reconstructed texture data from a previous frame, and the MFP prediction is used if its error to the texture data of the current frame is the smallest of all predictions.

At step 918, the control circuitry continues the predictive coding by coding the prediction error, summing the quantized difference (e.g., error) to the prediction to form a new reconstructed block, delaying the reconstructed block to be used for the predictions of the coming block, and sending all coded data to the receiver. For example, the control circuitry may code the prediction error by quantizing and channel coding the prediction error. The quantized difference may be summed to the prediction to form a new reconstructed block. The reconstructed block may be delayed to be used for the predictions of the coming block. In some embodiments, the steps of 918 are performed separately for the MFP prediction and the MDP prediction (e.g., texture data and depth map data).

At step 920, the control circuitry determines if all blocks have been processed. If all blocks have not been processed, at step 920, control circuitry proceeds to step 912. If all blocks have been processed, at step 920, control circuitry proceeds to step 922. At step 922, the control circuitry determines if all images are processed. If all images have not been processed, at step 922, control circuitry proceeds to step 904. If all images have not been processed, at step 922, the control circuitry proceeds to step 904. If all images have been processed, at step 922, the control circuitry proceeds to end the process at step 924.

Figure 10:
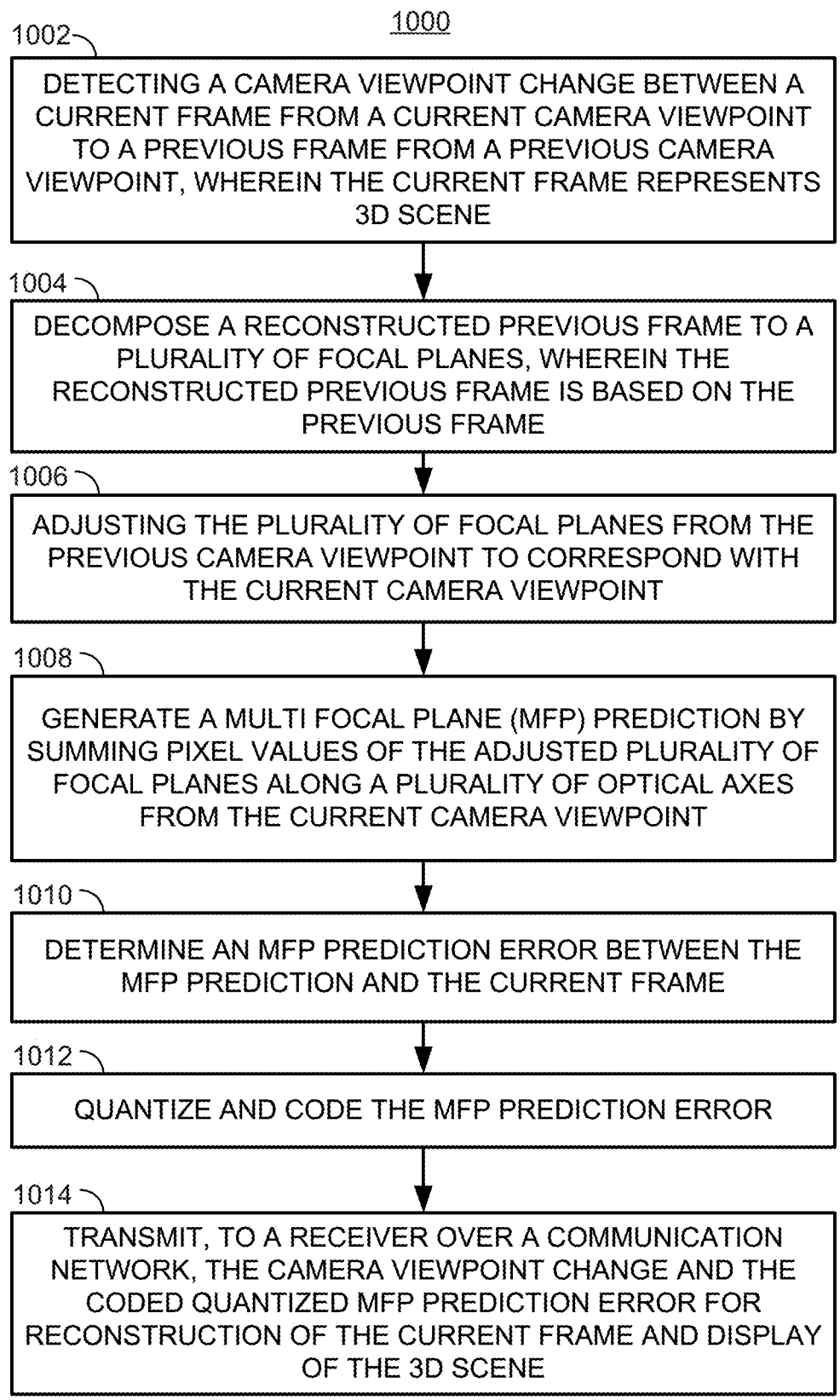
FIG. 10 is a flowchart of a detailed illustrative process for generating and using an MFP prediction for predictive coding, in accordance with some embodiments of this disclosure.

FIG. 10 is a flowchart of a detailed illustrative process for generating and using an MFP prediction for predictive coding, in accordance with some embodiments of this disclosure. In various embodiments, the individual steps of process 1000 may be implemented by one or more components of the devices and systems of FIGS. 1, 3, 4A, 7 and 8. Although the present disclosure may describe certain steps of process 1000 (and of other processes described herein) as being implemented by certain components of the devices and systems of FIGS. 1, 3, 4A, 7, and 8 this is for purposes of illustration only, and it should be understood that other components of the devices and systems of FIGS. 1, 3, 4A, 7, and 8 may implement those steps instead.

At step 1002, control circuitry (e.g., control circuitry 811, control circuitry 818, or control circuitry of any of devices 807, 808, or 810) detects a camera viewpoint change between a current frame from a current camera viewpoint to a previous frame from a previous camera viewpoint, wherein the current frame represents 3D scene. For example, control circuitry may detect the camera viewpoint change by deriving the camera viewpoint change by using tracking information from position sensors, deriving the camera viewpoint change by using the current frame and the previous frame, or some combination thereof.

At step 1004, the control circuitry decomposes a reconstructed previous frame to a plurality of focal planes, wherein the reconstructed previous frame is based on the previous frame. For example, the plurality of focal planes may include five focal planes that are regularly spaced in distance. In some embodiments, the plurality of focal planes may be irregularly spaced in distance. In some embodiments, the plurality of focal planes may be any suitable number of focal planes and may be regularly or irregularly spaced in distance. In some embodiments, the system decomposes a depth map of the reconstructed previous frame by depth blending into a plurality of weight planes. The system may use the plurality of weight planes for forming MFPs. For example, the system may perform pixelwise multiplication of each of the plurality of weight planes with a texture image of the reconstructed previous frame to form the plurality of focal planes (e.g., MFPs). In some embodiments, the texture image of the reconstructed previous frame may be a video frame and corresponding depth map concatenated into an image. In some embodiments, a depth map may be a monochrome image. In some embodiments, a depth map may indicate color pixel distances (e.g., pixels of a color image) and distances of its own pixels (e.g., pixels of the depth map itself, when decomposing a depth map to multiple depth planes).

At step 1006, the control circuitry adjusts the plurality of focal planes from the previous camera viewpoint to correspond to or match with the current camera viewpoint. For example, the control circuitry may adjust the plurality of focal planes by shifting each of the plurality of focal planes with a corresponding amount based on the camera viewpoint change, and scaling each of the plurality of focal planes by a corresponding scale factor based on the camera viewpoint change. A focal plane of the plurality of focal planes that is closer to the current camera viewpoint may be shifted more and scaled larger in comparison to a focal plane of the plurality of focal planes that is further from the current camera viewpoint.

At step 1008, the control circuitry generates a Multi Focal Plane (MFP) prediction by summing pixel values of the adjusted plurality of focal planes along a plurality of optical axes from the current camera viewpoint. For example, the plurality of optical axes may be a family of non-parallel lines going through the camera viewpoint (e.g., eye-point) and through each of the corresponding pixels in the plurality of focal planes (e.g., MFP stack). The plurality of optical axes may intersect a focal plane of the adjusted plurality of focal planes at a plurality of intersection points. In some embodiments, a distance between a first intersection point and a second intersection point of the plurality of intersection points may be less than a pixel spacing of an image corresponding to the focal plane. In some embodiments, the system may generate the MFP prediction by summing pixel values along each optical axis based on as many axes as there are pixels in an image corresponding to the focal plane. In some embodiments, the system may generate the MFP prediction by summing pixel values along optical axes corresponding to a portion of the pixels in an image corresponding to the focal plane (e.g., family of non-parallel lines going through the camera viewpoint and through a portion of the pixels in the image, such as skipping a neighboring pixel, etc.).

At step 1010, the control circuitry determines an MFP prediction error between the MFP prediction and the current frame. For example, the control circuitry may subtract the MFP prediction from the current frame. At step 1012, the control circuitry quantizes and codes the MFP prediction error. For example, the control circuitry may quantize the MFP prediction error and code the quantized MFP prediction error. For example, quantization may be reducing the set of used signal values to enable coding of the MFP prediction error with less bits (e.g. by referring with less indices or variable-length codes (VLCs)). At step 1014, input/output circuitry (e.g., input/output circuitry 812 of FIG. 8) connected to the control circuitry transmits, to a receiver over a communication network, the camera viewpoint change and the coded quantized MFP prediction error for reconstruction of the current frame and display of the 3D scene.

Figure 11:
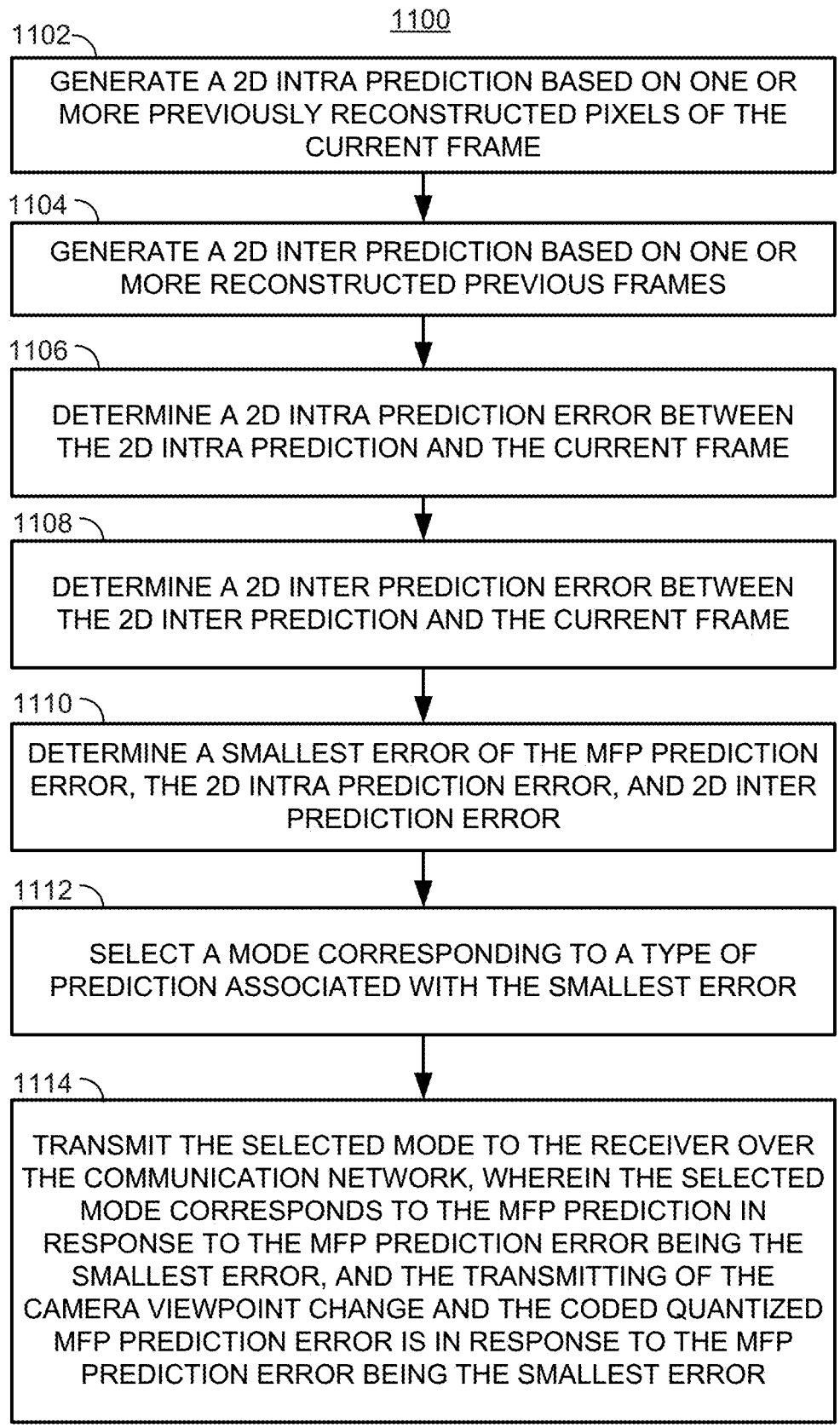
FIG. 11 is a flowchart of a detailed illustrative process for selecting an MFP prediction from other predictions in predictive coding, in accordance with some embodiments of this disclosure.

FIG. 11 is a flowchart of a detailed illustrative process for selecting an MFP prediction from other predictions in predictive coding, in accordance with some embodiments of this disclosure. In various embodiments, the individual steps of process 1100 may be implemented by one or more components of the devices and systems of FIGS. 1, 3, 4A, 7 and 8. Although the present disclosure may describe certain steps of process 1100 (and of other processes described herein) as being implemented by certain components of the devices and systems of FIGS. 1, 3, 4A, 7, and 8 this is for purposes of illustration only, and it should be understood that other components of the devices and systems of FIGS. 1, 3, 4A, 7, and 8 may implement those steps instead.

At step 1102, control circuitry (e.g., control circuitry 811, control circuitry 818, or control circuitry of any of devices 807, 808, or 810) generates a 2D intra prediction based on one or more previously reconstructed pixels of the current frame. At step 1104, control circuitry generates a 2D inter prediction based on one or more reconstructed previous frames. At step 1106, control circuitry determines a 2D intra prediction error between the 2D intra prediction and the current frame. At step 1108, control circuitry determines a 2D inter prediction error between the 2D inter prediction and the current frame. At step 1110, control circuitry determines a smallest error of the MFP prediction error, the 2D intra prediction error, and 2D inter prediction error. At step 1112, control circuitry selects a mode (e.g., prediction mode, coding mode) corresponding to a type of prediction associated with the smallest error. At step 1114, input/output circuitry (e.g., input/output circuitry 812 of FIG. 8) connected to the control circuitry transmits the selected mode to the receiver over the communication network, wherein the selected mode corresponds to the MFP prediction in response to the MFP prediction error being the smallest error, and the control circuitry transmitting the camera viewpoint change and the coded quantized MFP prediction error is in response to the MFP prediction error being the smallest error. In some embodiments, control circuitry may capture the previous frame at a previous time and code the previous frame. In some embodiments, input/output circuitry (e.g., input/output circuitry 812 of FIG. 8) connected to the control circuitry may transmit the coded previous frame to the receiver over the communication network. In some embodiments, control circuitry may quantize and code the previous frame. In some embodiments, input/output circuitry (e.g., input/output circuitry 812 of FIG. 8) connected to the control circuitry may transmit the coded quantized previous frame to the receiver over the communication network. In some embodiments, control circuitry may capture the current frame at a current time being the previous time plus a frame delay. The frame delay may be based on quantization accuracy in coding based on feedback from a status of the communication network or a status of the receiver over the communication network. The current frame and the previous frame may be each represented using video frame and a corresponding depth map.

In various embodiments, a process may be implemented for decoding an MFP prediction error. The individual steps of the process may be implemented by one or more components of the devices and systems of FIGS. 1, 3, 4A, 7 and 8. Although the present disclosure may describe certain steps of the process (and of other processes described herein) as being implemented by certain components of the devices and systems of FIGS. 1, 3, 4A, 7, and 8 this is for purposes of illustration only, and it should be understood that other components of the devices and systems of FIGS. 1, 3, 4A, 7, and 8 may implement those steps instead. In some embodiments, the system (e.g., system 100, receiver 130) receives, from a transmitter (e.g., transmitter 110) over a communication network, a camera viewpoint change and coded quantized MFP prediction error for reconstruction of a current frame and display of a 3D scene. In some embodiments, any of the steps for the process for decoding the MFP prediction error may be additionally or alternatively be performed by a control circuitry (e.g., control circuitry 611, control circuitry 618, or control circuitry of any of devices 607, 608, or 610). In some embodiments, input/output circuitry (e.g., input/output circuitry 812 of FIG. 8) connected to control circuitry receives, from a transmitter (e.g., transmitter 110) over a communication network, a camera viewpoint change and coded quantized MFP prediction error for reconstruction of a current frame and display of a 3D scene. The system (e.g., system 100, receiver 130, prediction block 140) may decompose a reconstructed previous frame to a plurality of focal planes. The reconstructed previous frame may be based on a previous frame. The system may adjust the plurality of focal planes from a previous camera viewpoint to correspond with a current camera viewpoint based on the camera viewpoint change. The system may generate an MFP prediction by summing pixel values of the adjusted plurality of focal planes along a plurality of optical axes from the current camera viewpoint. The system (e.g., system 100, receiver 130, decoding block 132) may decode the coded quantized MFP prediction error to generate a quantized MFP prediction error. The system (e.g., system 100, receiver 130, reconstruction block 138) may sum the quantized MFP prediction error and the MFP prediction to reconstruct the current frame. In some embodiments, the system (e.g., system 100, receiver 130) receives, from a transmitter over a communication network, a selected mode corresponding to the MFP prediction. In some embodiments, input/output circuitry (e.g., input/output circuitry 812 of FIG. 8) connected to control circuitry receives, from a transmitter over a communication network, a selected mode corresponding to the MFP prediction.

Variations for Applying MFP Based Viewpoint Prediction

Figure 12:
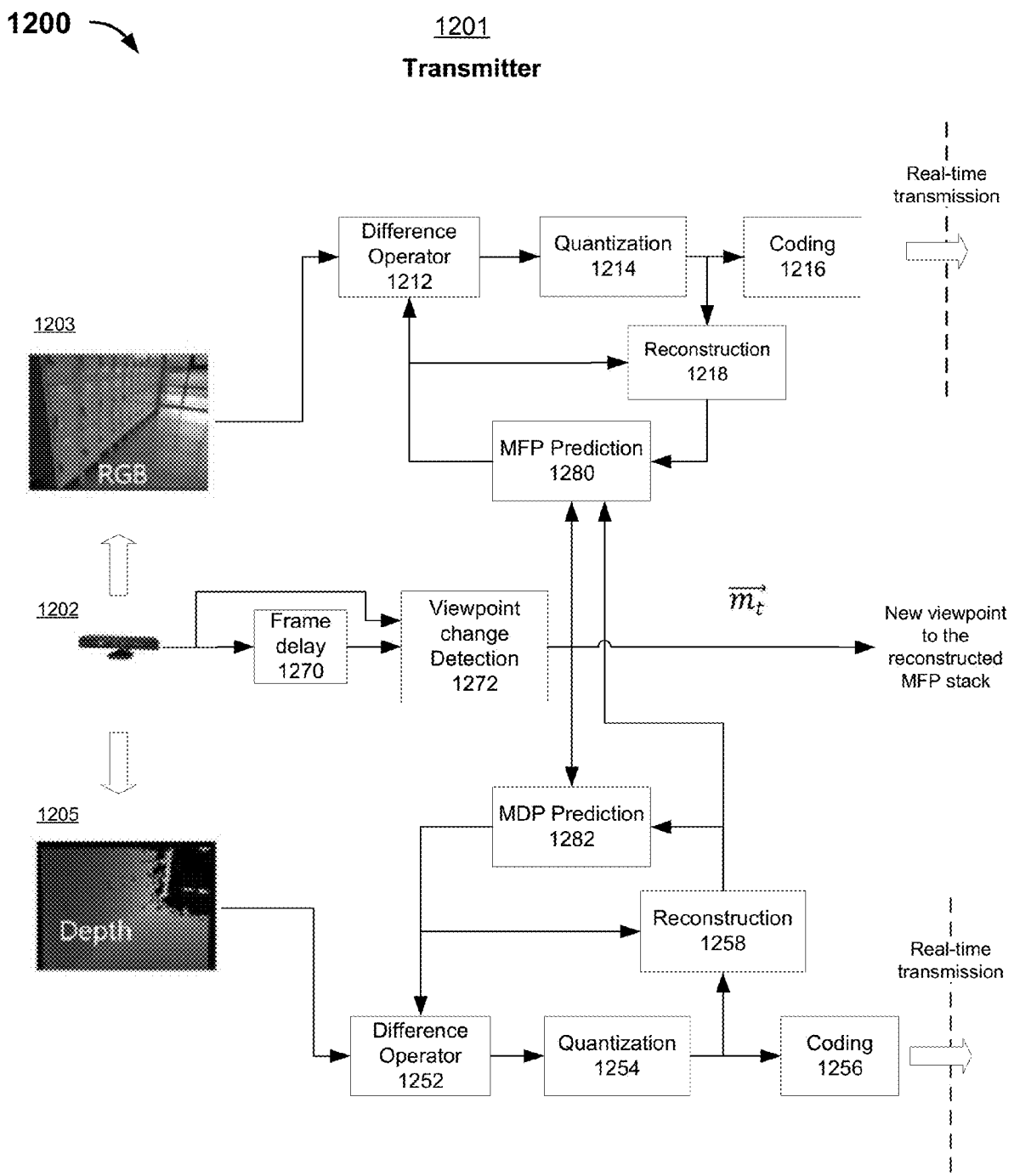
FIG. 12 shows an illustrative example of a schematic block diagram for coding video and depth signals using MFP prediction and MDP prediction in separate predictive coding loops, in accordance with some embodiments of this disclosure.
Figure 14:
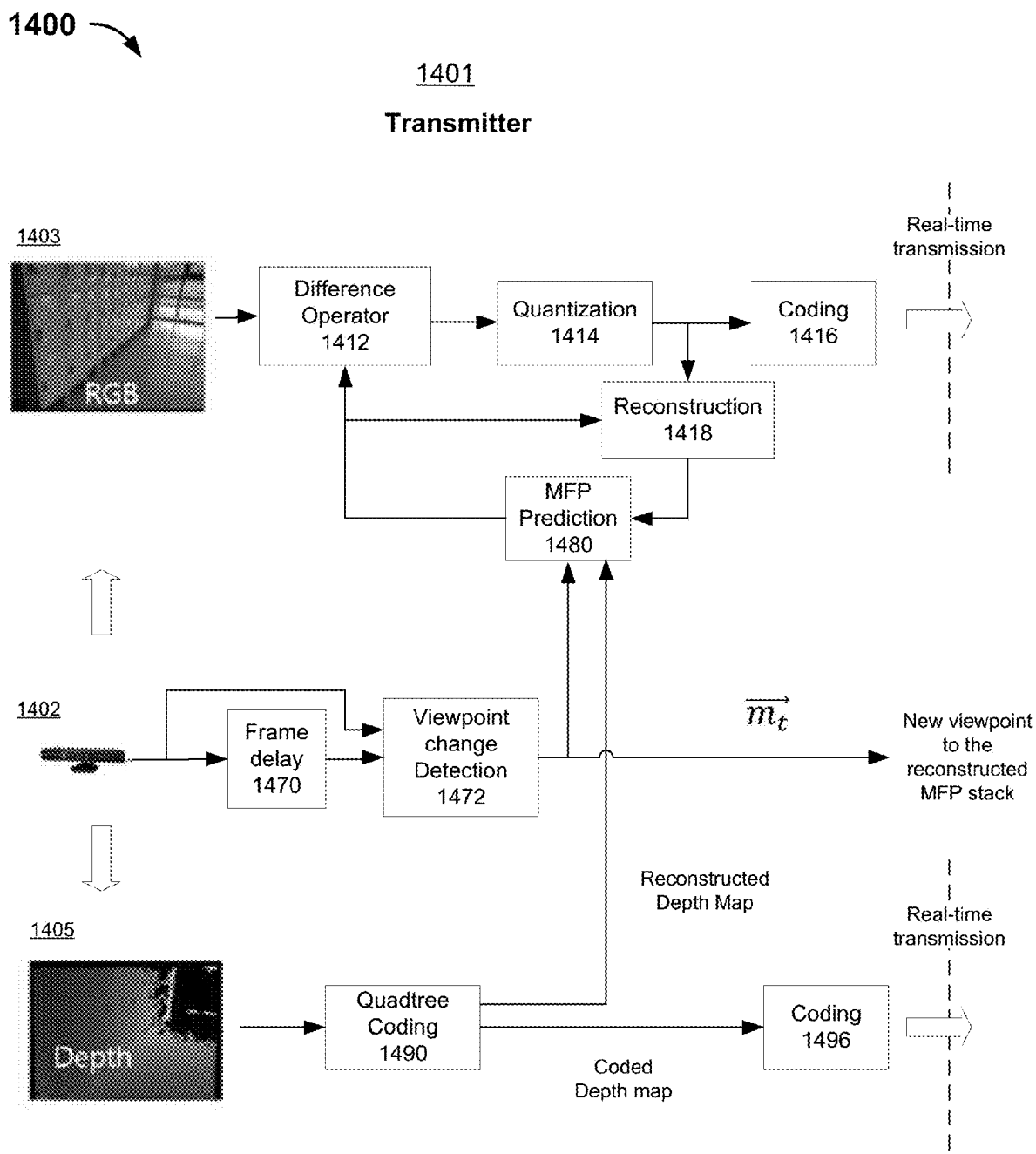
FIG. 14 shows an illustrative example of a schematic block diagram for coding video using a MFP prediction in a predictive coding loop and hierarchical coding for the depth signal, in accordance with some embodiments of this disclosure.

FIG. 12 and FIG. 14 show illustrative examples of two variations for the coding arrangements using video plus depth input signals, in accordance with some embodiments of the disclosure. For simplicity, FIGS. 12 and 14 shows the MFP and/or MDP prediction block without other prediction blocks (e.g., 2D intra and 2D inter prediction blocks). Correspondingly, for simplicity, a mode selection block and corresponding output signals are not shown in the illustrations.

FIG. 12 shows an illustrative example of a schematic block diagram 1200 for coding video (e.g., texture data) and depth signals (e.g., depth map) using MFP prediction and MDP prediction in separate predictive coding loops, in accordance with some embodiments of this disclosure. For simplicity, FIG. 12 depicts a transmitter 1201, but not a corresponding receiver. As illustrated earlier in FIG. 1, predictions (also the disclosed MFP and/or MDP predictions) may be made in an identical way in a decoder (e.g., receiver).

In FIG. 12, both components (e.g., texture data and depth data) are coded by predictive coding using an MFP prediction block and a MDP prediction block, respectively. For example, sensor device 1202 (e.g., a texture and depth sensor) may capture a stream of texture and depth data (e.g., texture and depth map) as input to a transmitter 1201. The texture data 1203 may be separated from the depth data 1205 and coded in separate predictive coding loops. For example, the texture data 1203 may be processed by a first group of blocks including difference operator block 1212, quantization block 1214, coding block 1216, reconstruction block 1218, and MFP prediction block 1280. For example, the depth data 1205 may be processed by a second group of blocks including difference operator block 1252, quantization block 1254, coding block 1256, reconstruction block 1258, and MDP prediction block 1282. The transmitter 1201 may include a frame delay block 1270 and a viewpoint change detection block 1272. The output of the viewpoint change detection block 1272 may be an input to the MFP prediction block 1280 and MDP prediction block 1282. The transmitter 1201 may transmit the change in viewpoint $\vec{m}_r$ as the new viewpoint to the reconstructed MFP stack in real-time transmission. The transmitter 1201 may transmit coded quantized MFP prediction error and coded quantized MDP prediction error in real-time transmission.

In some embodiments, the MFP prediction block 1280 is similar to (e.g., the same as) the MFP prediction unit shown earlier e.g. in FIGS. 3 and 4A except the inputs and outputs may be different. For example, the MFP prediction block 1280 may take as separate inputs reconstructed texture data and reconstructed depth data instead of a reconstructed frame (e.g., texture and depth data) of FIGS. 3 and 4A. For example, the MFP prediction block 1280 may output an MFP prediction for texture data instead of an MFP prediction for texture and depth data of FIGS. 3 and 4A. For example, in FIGS. 3 and 4A, the texture and depth data may be concatenated into an image, and the concatenated texture and depth data may be considered a texture image. The depth map portion of the input data (e.g., separated in separation unit 451 of the MFP prediction unit of FIG. 4A) may be used to decompose the concatenated texture image into MFPs, which are then processed (shifted and scaled) to form an MFP prediction for both texture and depth data. For example, in FIG. 12, only the texture data may be considered the texture image for MFP prediction block 1280. The MFP prediction block 1280 may use reconstructed depth data to decompose the texture image into MFPs, which are then processed (shifted and scaled) to form an MFP prediction for texture data. In some embodiments, the MFP prediction block 1280 may include a group of blocks similar to those included in the MFP prediction unit shown earlier e.g., in FIGS. 3 and 4A, but blocks may be modified, added, reordered, and/or removed, to handle the inputs and outputs of the MFP prediction block 1280 as appropriate.

In some embodiments, the MDP prediction block 1282 is similar to (e.g., the same as) the MFP prediction block 1280 (and the MFP prediction unit shown earlier e.g. in FIGS. 3 and 4A) except the inputs and outputs may be different. For example, the MDP prediction block 1282 is similar to (e.g., the same as) the MFP prediction block 1280, with decomposition for texture and depth made in a same way, but with different inputs to be decomposed. The MDP prediction block (e.g., MDP prediction block 1282) may receive as an input a depth map (e.g., reconstructed depth map from reconstruction block 1258) without texture data. The MFP prediction block (e.g., MFP prediction block 1280) may receive as inputs a depth map (e.g., reconstructed depth map from reconstruction block 1258) and texture data (e.g., reconstructed texture data from reconstruction block 1218). The MDP prediction block 1282 may have as an input a depth map (non-textured image, i.e., a depth map in grayscale, without colors) to be decomposed, and the MFP prediction block 1280 may have as an input textured (color) image to be decomposed. Decomposition for the depth map may be made in a same or similar way as for texture. For example, the MFP prediction block 1280 may decompose the depth map by depth blending into a number of weight planes, and the number of weight planes may be used to form a number of MFPs by pixelwise multiplication with the texture image. Similarly, for example, the MDP prediction block 1282 may decompose the depth map by depth blending into a number of weight planes, and the number of weight planes may be used to form a number of MDPs by pixelwise multiplication with the depth map itself. In some embodiments, the MDP prediction block 1280 may output an MDP prediction for depth data (e.g., depth map). In some embodiments, the MDP prediction block 1282 may include a group of blocks similar to those included in the MFP prediction unit shown earlier e.g., in FIGS. 3 and 4A, but blocks may be modified, added, reordered, and/or removed, to handle the inputs and outputs of the MDP prediction block 1282 as appropriate.

In some embodiments, the MDP prediction block 1282 is different from the MFP prediction block 1280 (and the MFP prediction unit shown earlier e.g. in FIGS. 3 and 4A) in that the inputs and outputs are different (e.g., MDP prediction block 1282 may take as separate inputs reconstructed texture data and reconstructed depth data) and the MDP may be performed without forming weight planes. For example, depth blending may be performed without forming weight planes (i.e. intermediate results in image format). For example, depth blending may be a pixel based operation, and depth blending may be made pixel by pixel using the depth blending functions. In some embodiments, depth blending may be performed using pixel-by-pixel processing, without forming intermediate results in image format.

In some embodiments, the difference operator blocks 1212 and 1252 are similar to (e.g., the same as) as the difference operator block 312 in FIG. 3. In some embodiments, the quantization blocks 1214 and 1254, coding blocks 1216 and 1256, and reconstruction blocks 1218 and 1258, are similar to (e.g., the same as) quantization block 314, coding block 316, and reconstruction block 318, respectively, in FIG. 3. In some embodiments, the frame delay 1270 and the viewpoint change detection 1272 are similar to (e.g., the same as) the frame delay 370 and viewpoint change detection 372, respectively, in FIG. 3. In some embodiments, the difference between the similarly named blocks (e.g., difference operator, quantization, reconstruction, and coding blocks) of FIG. 12 and FIG. 3 may be that the inputs and outputs of similarly named blocks may be different. For example, the inputs and outputs of similarly named blocks may be in a different form (e.g., only texture data or only depth data for FIG. 12 instead of texture and depth data (e.g., texture and depth map) for FIG. 3).

Figure 13:
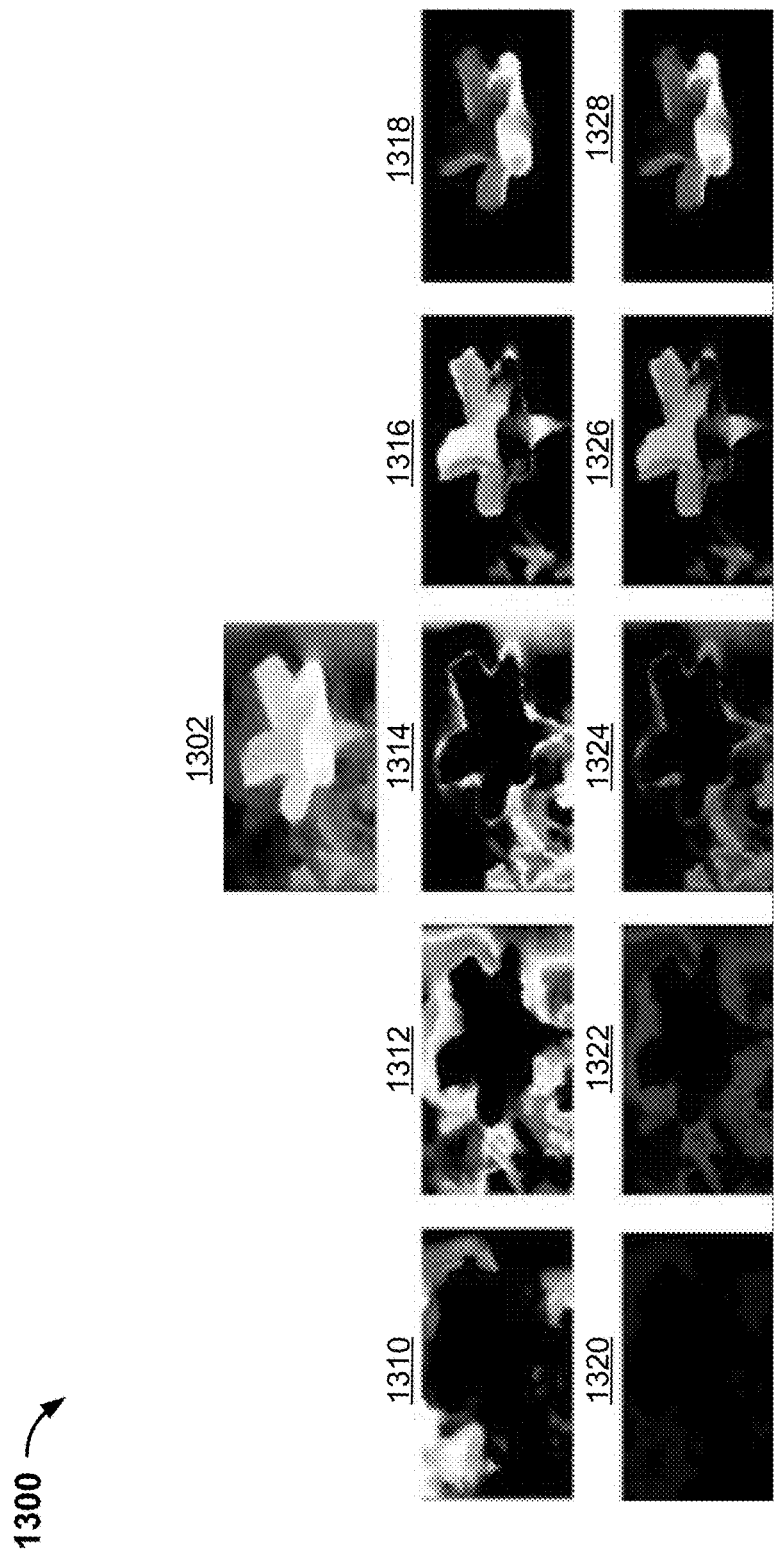
FIG. 13 shows an illustrative example of a depth map decomposed into piece-wise linear weight planes, used for forming depth map planes, in accordance with some embodiments of this disclosure.

FIG. 13 shows an illustrative example of a depth map 1302 decomposed into piece-wise linear weight planes 1310, 1312, 1314, 1316, and 1318, used for forming depth map planes 1320, 1322, 1324, 1326, and 1328, in accordance with some embodiments of this disclosure. Depth blending may be used in the normal way also when coding a depth map. FIG. 13 illustrates weighting of a depth map 1302 by five piece-wise linear weight functions, producing a set of five weight planes 1310, 1312, 1314, 1316, and 1318. Multiplying the image to be decomposed (here, the depth map itself 1302, by pixelwise multiplication) with the weight planes 1310, 1312, 1314, 1316, and 1318 produces a stack of five focal planes for the depth map 1320, 1322, 1324, 1326, and 1328. To distinguish from normal focal planes (MFPs), these planes are denoted here as multiple depth planes (MDPs). The weight planes are the same as in FIG. 2.

The new viewpoint to the stack of depth planes may be the same as for the stack of focal planes in the texture coding loop. After shifting and scaling the multiple depth planes (e.g., adjusting the MDPs), the sum of the MDPs (e.g., sum of depth plane pixel values along each optical axis from the new viewpoint) may give a new 3D viewpoint prediction for the incoming (newest) depth map image. A predicted depth map may be referred to as a 3D-MDP prediction or MDP prediction.

FIG. 14 shows an illustrative example of a schematic block diagram for coding video (e.g., texture data) using an MFP prediction in a predictive coding loop and hierarchical coding for the depth signal (e.g., depth map), in accordance with some embodiments of this disclosure. For simplicity, FIG. 14 depicts a transmitter 1401, but not a corresponding receiver. As illustrated earlier in FIG. 1, predictions (also the disclosed MFP prediction) may be made in an identical way in a decoder (e.g., receiver).

In FIG. 14, the texture data 1403 is coded by predictive coding using MFP prediction block. For example, the sensor device 1402 (e.g., a texture and depth sensor) may capture a stream of texture and depth data (e.g., texture and depth map) as input to a transmitter 1401. The texture data 1403 may be separated from the depth data 1405. The video (e.g., texture data) may be processed by a first group of blocks including the difference operator block 1412, quantization block 1414, coding block 1416, reconstruction block 1418, and MFP prediction block 1480. For example, the depth data 1405 may be processed by a second group of blocks including quadtree coding block 1490 and coding block 1496. The transmitter 1401 may include a frame delay block 1470 and a viewpoint change detection block 1472. The output of the viewpoint change detection block 1472 may be an input to the MFP prediction block 1480. The transmitter 1401 may transmit the change in viewpoint $\vec{m}_t$ as the new viewpoint to the reconstructed MFP stack in real-time transmission. The transmitter 1401 may transmit coded quantized MFP prediction error and a coded depth map (e.g., a further coded depth map, a depth map processed by quadtree coding block 1490 and coding block 1496) in real-time transmission.

In some embodiments, the difference operator block 1412, quantization block 1414, coding block 1416, reconstruction block 1418, and MFP prediction block 1480, are similar to (e.g., the same as) difference operator block 1212, quantization block 1214, coding block 1216, reconstruction block 1218, and MFP prediction block 1280, respectively, of FIG. 12. In some embodiments, the frame delay 1470, and the viewpoint change detection 1472 are similar to (e.g., the same as) the frame delay 1270, and the viewpoint change detection 1272, respectively, of FIG. 12. In some embodiments, the coding block 1496 is similar to (e.g., the same as) coding block 1216 of FIG. 12.

The quadtree coding block 1490 may code a signal using a method based on quadtrees. In some embodiments, the quadtree coding block 1490 takes as an input depth data (e.g., depth data 1405), codes the depth data using a method based on quadtrees, and outputs coded depth data (e.g., coded depth map). In some embodiments, the quadtree coding block 1490 outputs (1) a reconstructed depth map and (2) a coded depth map. The output of the quadtree coding block 1490 may be provided as an input to the MFP prediction block 1480 as a reconstructed depth map. The output of the quadtree coding block 1490 may be provided as an input to the coding block 1496 as a coded depth map. In some embodiments, the depth data may be coded using any suitable coding method (e.g., instead of a quadtree coding block 1490 in FIG. 14, any suitable coding block may be used).

In the example in FIG. 14, the depth map data may be coded without using predictive coding. For example, the depth data may be coded using a coding method based on quadtrees (e.g., part of 3D-HEVC). Correspondingly, decomposing a depth signal into an MDP stack (or viewpoint generation thereof) is not shown for the approach of FIG. 14.

In some embodiments, the MFP prediction block 1480 receives a reconstructed depth map from the quadtree coding block 1490. The MFP prediction block 1480 may use the reconstructed depth map to do the decomposition by depth blending. The coded depth map may be in image form, and may contain the coding errors (i.e., it is a reconstructed frame). As a reconstructed frame, the coded depth map may be in image form, and may not be in a coded form (e.g., reduced set of VLCs).

In some embodiments, the coding block 1496 receives a coded depth map as an input. The coding block 1496 may further code the coded depth map to output a further coded depth map. The transmitter 1401 may transmit the further coded depth map in real time transmission.

Figure 15:
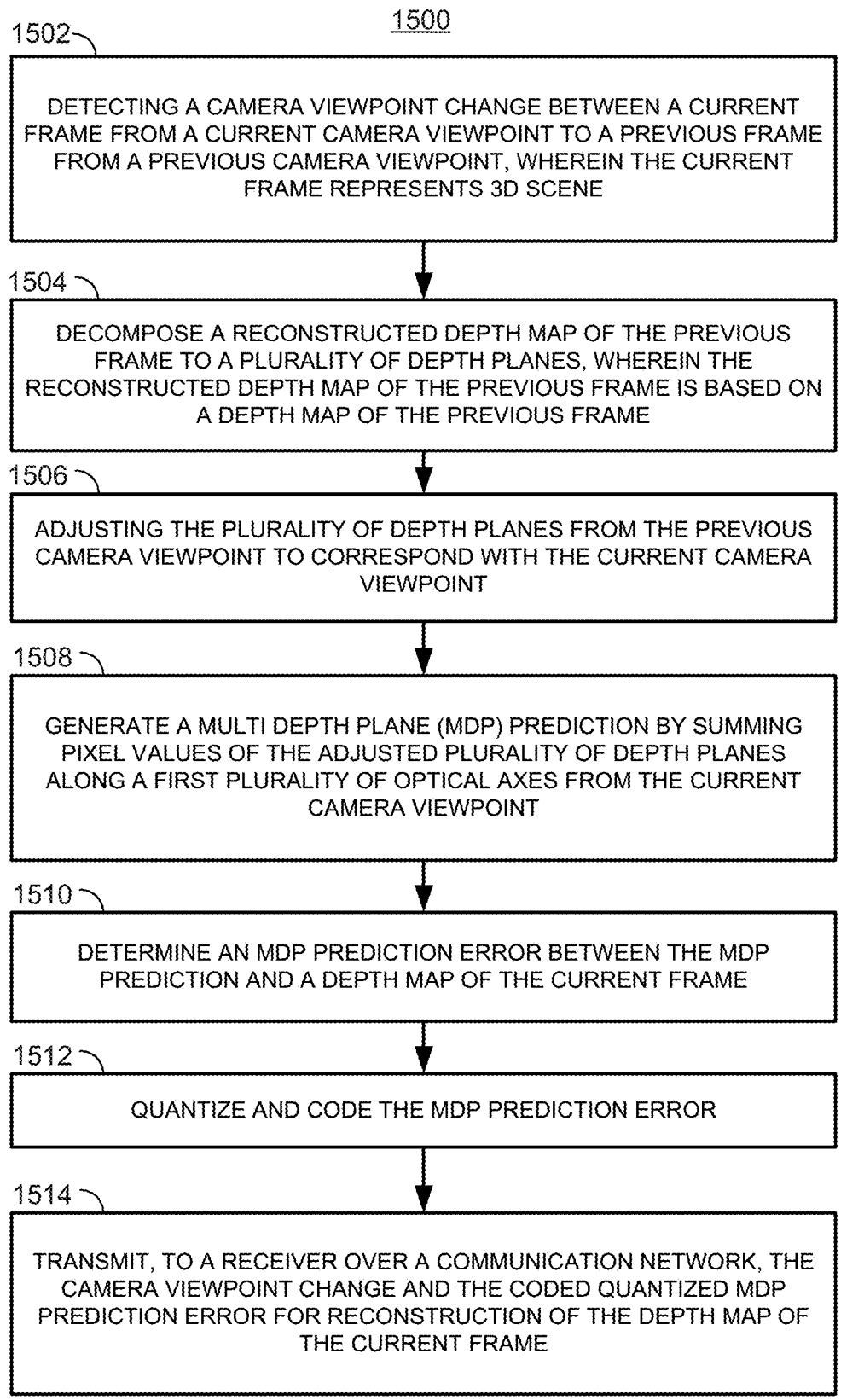
FIG. 15 is a flowchart of a detailed illustrative process for generating and using an MDP prediction for coding video depth in predictive coding, in accordance with some embodiments of this disclosure.

FIG. 15 is a flowchart of a detailed illustrative process for generating and using an MDP prediction for coding video depth in predictive coding, in accordance with some embodiments of this disclosure. In various embodiments, the individual steps of process 1500 may be implemented by one or more components of the devices and systems of FIGS. 1, 7, 8, and 12. Although the present disclosure may describe certain steps of process 1500 (and of other processes described herein) as being implemented by certain components of the devices and systems of FIGS. 1, 7, 8, and 12 this is for purposes of illustration only, and it should be understood that other components of the devices and systems of FIGS. 1, 7, 8, and 12 may implement those steps instead.

At step 1502, control circuitry (e.g., control circuitry 811, control circuitry 818, or control circuitry of any of devices 807, 808, or 810) detects a camera viewpoint change between a current frame from a current camera viewpoint to a previous frame from a previous camera viewpoint, wherein the current frame represents 3D scene. For example, control circuitry may detect the camera viewpoint change by deriving the camera viewpoint change by using tracking information from position sensors, deriving the camera viewpoint change by using the current frame and the previous frame, or some combination thereof.

At step 1504, the control circuitry decomposes a reconstructed depth map of the previous frame to a plurality of depth planes, wherein the reconstructed depth map of the previous frame is based on the depth map of the previous frame. For example, the plurality of depth planes may include five depth planes that are regularly spaced in distance. In some embodiments, the plurality of depth planes may be irregularly spaced in distance. In some embodiments, the plurality of depth planes may be any suitable number of depth planes and may be regularly or irregularly spaced in distance. In some embodiments, the system decomposes a reconstructed depth map of a previous frame by depth blending into a plurality of weight planes. The system may use the plurality of weight planes for forming MDPs. For example, the system may perform pixelwise multiplication of each of the plurality of weight planes with the reconstructed depth map of the previous frame to form the plurality of depth planes (e.g., MDPs).

At step 1506, the control circuitry adjusts the plurality of depth planes from the previous camera viewpoint to correspond to or match with the current camera viewpoint. For example, the control circuitry may adjust the plurality of depth planes by shifting each of the plurality of depth planes with a corresponding amount based on the camera viewpoint change, and scaling each of the plurality of depth planes by a corresponding scale factor based on the camera viewpoint change. A depth plane of the plurality of depth planes that is closer to the current camera viewpoint may be shifted more and scaled larger in comparison to a depth plane of the plurality of depth planes that is further from the current camera viewpoint.

At step 1508, the control circuitry generates a Multi Depth Plane (MDP) prediction by summing pixel values of the adjusted plurality of depth planes along a first plurality of optical axes from the current camera viewpoint. For example, the first plurality of optical axes may be a family of non-parallel lines going through the camera viewpoint (e.g., eye-point) and through each of the corresponding pixels in the plurality of depth planes (e.g., MDP stack). The first plurality of optical axes may intersect a depth plane of the adjusted plurality of depth planes at a first plurality of intersection points. In some embodiments, a distance between a first intersection point and a second intersection point of the first plurality of intersection points may be less than a pixel spacing of an image corresponding to the depth plane. In some embodiments, the system may generate the MDP prediction by summing pixel values along each optical axis based on as many axes as there are pixels in an image corresponding to the depth plane. In some embodiments, the system may generate the MDP prediction by summing pixel values along optical axes corresponding to a portion of the pixels in an image corresponding to the depth plane (e.g., family of non-parallel lines going through the camera viewpoint and through a portion of the pixels in the image, such as skipping a neighboring pixel, etc.).

At step 1510, the control circuitry determines an MDP prediction error between the MDP prediction and a depth map of the current frame. For example, the control circuitry may subtract the MDP prediction from the depth map of the current frame. At step 1512, the control circuitry quantizes and codes the MDP prediction error. For example, the control circuitry may quantize the MDP prediction error and code the quantized MDP prediction error. For example, quantization may be reducing the set of used signal values to enable coding of the MDP prediction error with less bits (e.g. by referring with less indices or variable-length codes (VLCs)). At step 1514, input/output circuitry (e.g., input/output circuitry 812 of FIG. 8) connected to the control circuitry transmits, to a receiver over a communication network, the camera viewpoint change and the coded quantized MDP prediction error for reconstruction of the depth map of the current frame.

FIG. 16 is a flowchart of a detailed illustrative process for generating and using an MFP prediction for coding video textures in predictive coding, in accordance with some embodiments of this disclosure. In various embodiments, the individual steps of process 1600 may be implemented by one or more components of the devices and systems of FIGS. 1, 7, 8, 12, and 14. Although the present disclosure may describe certain steps of process 1600 (and of other processes described herein) as being implemented by certain components of the devices and systems of FIGS. 1, 7, 8, 12, and 14 this is for purposes of illustration only, and it should be understood that other components of the devices and systems of FIGS. 1, 7, 8, 12, and 14 may implement those steps instead.

At step 1604, the control circuitry decomposes a reconstructed texture data of the previous frame to a plurality of focal planes, wherein the reconstructed texture data of the previous frame is based on the texture data of the previous frame. For example, the plurality of focal planes may include five focal planes that are regularly spaced in distance. In some embodiments, the plurality of focal planes may be irregularly spaced in distance. In some embodiments, the plurality of focal planes may be any suitable number of focal planes and may be regularly or irregularly spaced in distance. In some embodiments, the system decomposes a reconstructed depth map of a previous frame by depth blending into a plurality of weight planes. The system may use the plurality of weight planes for forming MFPs. For example, the system may perform pixelwise multiplication of each of the plurality of weight planes with the reconstructed texture data of the previous frame to form the plurality of focal planes (e.g., MFPs).

At step 1606, the control circuitry adjusts the plurality of focal planes from the previous camera viewpoint to correspond to or match with the current camera viewpoint. For example, the control circuitry may adjust the plurality of focal planes by shifting each of the plurality of focal planes with a corresponding amount based on the camera viewpoint change, and scaling each of the plurality of focal planes by a corresponding scale factor based on the camera viewpoint change. A focal plane of the plurality of focal planes that is closer to the current camera viewpoint may be shifted more and scaled larger in comparison to a focal plane of the plurality of focal planes that is further from the current camera viewpoint.

At step 1608, the control circuitry generates a Multi Focal Plane (MFP) prediction by summing pixel values of the adjusted plurality of focal planes along a second plurality of optical axes from the current camera viewpoint. For example, the second plurality of optical axes may be a family of non-parallel lines going through the camera viewpoint (e.g., eye-point) and through each of the corresponding pixels in the plurality of focal planes (e.g., MFP stack). The second plurality of optical axes may intersect a focal plane of the adjusted plurality of focal planes at a first plurality of intersection points. In some embodiments, a distance between a first intersection point and a second intersection point of the first plurality of intersection points may be less than a pixel spacing of an image corresponding to the focal plane. In some embodiments, the system may generate the MFP prediction by summing pixel values along each optical axis based on as many axes as there are pixels in an image corresponding to the focal plane. In some embodiments, the system may generate the MFP prediction by summing pixel values along optical axes corresponding to a portion of the pixels in an image corresponding to the focal plane (e.g., family of non-parallel lines going through the camera viewpoint and through a portion of the pixels in the image, such as skipping a neighboring pixel, etc.).

In some embodiments, the first plurality and the second plurality of optical axes may correspond to a same plurality of optical axes (e.g., each plurality of optical axes may have a same number of optical axes, a distance between a first intersection point and a second intersection point of the first plurality of intersection points may be the same as a distance between a first intersection point and a second intersection point of the second plurality of intersection points). In some embodiments, the first plurality and the second plurality of optical axes may correspond to a different plurality of optical axes (e.g., each plurality of optical axes may have a different number of optical axes, a distance between a first intersection point and a second intersection point of the first plurality of intersection points may be different than a distance between a first intersection point and a second intersection point of the second plurality of intersection points).

At step 1610, control circuitry determines an MFP prediction error between the MFP prediction and the texture data of the current frame. For example, the control circuitry may subtract the MFP prediction from the texture data of the current frame. At step 1612, control circuitry quantizes and codes the MFP prediction error. For example, the control circuitry may quantize the MFP prediction error and code the quantized MFP prediction error. For example, quantization may be reducing the set of used signal values to enable coding of the MFP prediction error with less bits (e.g. by referring with less indices or variable-length codes (VLCs)). At step 1614, input/output circuitry (e.g., input/output circuitry 812 of FIG. 8) connected to the control circuitry transmits, to a receiver over a communication network, the coded quantized MFP prediction error for reconstruction of the texture data of the current frame.

In some embodiments, control circuitry generates a 2D intra depth map prediction based on one or more reconstructed pixels of the depth map of the current frame. The control circuitry may generate a 2D inter depth map prediction based on one or more reconstructed depth maps of the previous frames. The control circuitry may determine a 2D intra depth map prediction error between the 2D intra depth map prediction and the depth map of the current frame. The control circuitry may determine a 2D inter depth map prediction error between the 2D inter depth map prediction of the depth map and the depth map of the current frame. The control circuitry may determine a smallest depth map error of the MDP prediction error, the 2D intra depth map prediction error, and 2D inter depth map prediction error. The control circuitry may select a depth map mode corresponding to a type of depth map prediction associated with the smallest depth map error.

In some embodiments, control circuitry generates a 2D intra texture data prediction based on one or more reconstructed pixels of the texture data of the current frame. The control circuitry may generate a 2D inter texture data prediction based on one or more reconstructed texture data of the previous frames. The control circuitry may determine a 2D intra texture data prediction error between the 2D intra texture data prediction and the texture data of the current frame. The control circuitry may determine a 2D inter texture data prediction error between the 2D inter texture data prediction and the texture data of the current frame. The control circuitry may determine a smallest texture data error of the MFP prediction error, the 2D intra texture data prediction error, and 2D inter texture data prediction error. The control circuitry may select a texture data mode corresponding to a type of texture data prediction associated with the smallest texture data error.

In some embodiments, input/output circuitry (e.g., input/output circuitry 812 of FIG. 8) connected to control circuitry transmits the selected depth map mode and the selected texture data mode to the receiver over the communication network. The selected depth map mode may correspond to the MDP prediction in response to the MDP prediction error being the smallest depth map error. The selected texture data mode may correspond to the MFP prediction in response to the MFP prediction error being the smallest texture data error. The input/output circuitry may transmit the camera viewpoint change, the coded quantized MDP prediction error, and the coded quantized MFP prediction error in response to the MDP prediction error being the smallest depth map error and the MFP prediction error being the smallest texture data error.

In some embodiments, control circuitry captures the previous frame at a previous time. Control circuitry may separate texture data from the depth map (e.g., depth data, depth map data) from the previous frame. Control circuitry may code the texture data from the previous frame, and code the depth map from the previous frame. In some embodiments, input/output circuitry (e.g., input/output circuitry 812 of FIG. 8) connected to the control circuitry may transmit the coded texture data and the coded depth map from the previous frame to the receiver over the communication network. In some embodiments, control circuitry may quantize and code the texture data from the previous frame, and quantize and code the depth map from the previous frame. In some embodiments, input/output circuitry (e.g., input/output circuitry 812 of FIG. 8) connected to the control circuitry may transmit the coded quantized texture data and the coded quantized depth map from the previous frame to the receiver over the communication network. In some embodiments, control circuitry may capture the current frame at a current time being the previous time plus a frame delay. The frame delay may be based on quantization accuracy in coding based on feedback from a status of the communication network or a status of the receiver over the communication network.

In various embodiments, a process may be implemented for decoding an MDP prediction error. In some embodiments, the system (e.g., system 100, receiver 130) receives, from a transmitter (e.g., transmitter 110) over a communication network, a camera viewpoint change and a coded quantized MDP prediction error for reconstruction of a depth map of a current frame. In some embodiments, any of the steps for the process for decoding the MDP prediction error may be additionally or alternatively be performed by a control circuitry (e.g., control circuitry 611, control circuitry 618, or control circuitry of any of devices 607, 608, or 610). In some embodiments, input/output circuitry (e.g., input/output circuitry 812 of FIG. 8) connected to control circuitry receives, from a transmitter (e.g., transmitter 110) over a communication network, a camera viewpoint change and a coded quantized MDP prediction error for reconstruction of a depth map of a current frame. In some embodiments, the system receives a selected mode (e.g., selected depth map mode) corresponding to an MDP prediction, and the systems decodes the received coded quantized MDP prediction error responsive to determining the selected mode corresponds to an MDP prediction.

The system (e.g., system 100, receiver 130, prediction block 140) may decompose a reconstructed depth map of a previous frame to a plurality of depth planes. The reconstructed depth map of the previous frame may be based on a depth map of the previous frame. The system may adjust the plurality of depth planes from the previous camera viewpoint to correspond with a current camera viewpoint based on the camera viewpoint change. The system may generate an MDP prediction by summing pixel values of the adjusted plurality of depth planes along a first plurality of optical axes from the current camera viewpoint. The system (e.g., system 100, receiver 130, decoding block 132) may decode the coded quantized MDP prediction error to generate a quantized MDP prediction error. The system (e.g., system 100, receiver 130) may sum the quantized MDP prediction error and the MDP prediction to reconstruct the depth map of the current frame. The system (e.g., system 100, receiver 130) may receive, from a transmitter (e.g., transmitter 110) over a communication network, a coded quantized MFP prediction error for reconstruction of texture data of the current frame. In some embodiments, input/output circuitry (e.g., input/output circuitry 812 of FIG. 8) connected to control circuitry receives, from a transmitter over a communication network, a coded quantized MFP prediction error for reconstruction of texture data of the current frame. The system (e.g., system 100, receiver 130, decoding block 132) may decode the coded quantized MFP prediction error to generate a quantized MFP prediction error, and the system (e.g., system 100, receiver 130, reconstruction block 138) may sum the quantized MFP prediction error and the MFP prediction to reconstruct the texture data of the current frame. In some embodiments, the system receives a selected mode (e.g., selected texture data mode) corresponding to an MFP prediction, and the systems decodes the received coded quantized MFP prediction error responsive to determining the selected mode corresponds to an MFP prediction.

In some embodiments, the system receives, (e.g., system 100, receiver 130) from a transmitter (e.g., transmitter 110) over a communication network, a selected mode corresponding to the MFP prediction and the MDP prediction. In some embodiments, the system receives, (e.g., system 100, receiver 130) from a transmitter (e.g., transmitter 110) over a communication network, a selected mode corresponding to the MFP prediction. In some embodiments, the system receives, (e.g., system 100, receiver 130) from a transmitter (e.g., transmitter 110) over a communication network, a selected mode corresponding to the MDP prediction. In some embodiments, input/output circuitry (e.g., input/output circuitry 812 of FIG. 8) connected to control circuitry receives, from a transmitter over a communication network, a selected mode corresponding to the MFP prediction and/or the MDP prediction.

In some embodiments, MFPs may be used for increasing coding efficiency in predictive coding. A projected viewpoint to an MFP stack (i.e. one image instead of a plurality of images) may be used as a 3D (MFP) prediction, which—if selected by the encoder—may be improved by sending additional coded information on remaining prediction errors. The approach may be a way to upgrade 2D coding methods by 3D-viewpoint based predictions. In the disclosed approach, a changed camera viewpoint may be detected in the encoder and sent to the decoder. The approach may increase the coding efficiency of videos (video plus depth signals) from a moving camera/sensor.

Reducing differences between successive video frames (i.e. bitrate) by compensating camera motion for complete video (plus depth) frames may have a result that is sensitive to inaccuracy or lack of information—especially for the depth data, which may have holes (voids) and errors due to inadequate backscatter from the scene. In some embodiments, a 3D prediction may often be better (e.g., improve prediction and efficiency) than traditional predictions based on motion compensated 2D blocks. If the 3D (MFP) prediction is taken to one of several prediction options, a poor 3D prediction (e.g. due low quality of received depth data) may be rejected by the encoder.

In some embodiments, the procedure of synthesizing viewpoints from MFPs (e.g., forming a viewpoint by image shifting and scaling operations) may have improvements in speed compared to using 3D warping operations, especially if a graphic processor or a like is not in use.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    detecting a camera viewpoint change between a current frame from a current camera viewpoint to a previous frame from a previous camera viewpoint, wherein the current frame represents 3D scene;
    decomposing a reconstructed depth map of the previous frame to a plurality of depth planes, wherein the reconstructed depth map of the previous frame is based on a depth map of the previous frame;
    adjusting the plurality of depth planes from the previous camera viewpoint to correspond with the current camera viewpoint;
    generating a Multi Depth Plane (MDP) prediction by summing pixel values of the adjusted plurality of depth planes along a first plurality of optical axes from the current camera viewpoint;
    determining an MDP prediction error between the MDP prediction and a depth map of the current frame;
    quantizing and coding the MDP prediction error; and
    transmitting, to a receiver over a communication network, the camera viewpoint change and the coded quantized MDP prediction error for reconstruction of the depth map of the current frame.

2. The method of claim 1, further comprising:
    decomposing a reconstructed texture data from the previous frame to a plurality of focal planes, wherein the reconstructed texture data from the previous frame is based on texture data of the previous frame;
adjusting the plurality of focal planes from the previous camera viewpoint to correspond with the current camera viewpoint;
generating a Multi Focal Plane (MFP) prediction by summing pixel values of the adjusted plurality of focal planes along a second plurality of optical axes from the current camera viewpoint;
determining an MFP prediction error between the MFP prediction and the texture data of the current frame;
quantizing and coding the MFP prediction error;
transmitting, to a receiver over the communication network, the coded quantized MFP prediction error for reconstruction of texture data of the current frame.

3. The method of claim 2, further comprising:
generating a 2D intra depth map prediction based on one or more reconstructed pixels of the depth map of the current frame;
generating a 2D inter depth map prediction based on one or more reconstructed depth maps of the previous frames;
determining a 2D intra depth map prediction error between the 2D intra depth map prediction and the depth map of the current frame;
determining a 2D inter depth map prediction error between the 2D inter depth map prediction of the depth map and the depth map of the current frame;
determining a smallest depth map error of the MDP prediction error, the 2D intra depth map prediction error, and 2D inter depth map prediction error;
selecting a depth map mode corresponding to a type of depth map prediction associated with the smallest depth map error;
generating a 2D intra texture data prediction based on one or more reconstructed pixels of the texture data of the current frame;
generating a 2D inter texture data prediction based on one or more reconstructed texture data of the previous frames;
determining a 2D intra texture data prediction error between the 2D intra texture data prediction and the texture data of the current frame;
determining a 2D inter texture data prediction error between the 2D inter texture data prediction and the texture data of the current frame;
determining a smallest texture data error of the MFP prediction error, the 2D intra texture data prediction error, and 2D inter texture data prediction error;
selecting a texture data mode corresponding to a type of texture data prediction associated with the smallest texture data error; and
transmitting the selected depth map mode and the selected texture data mode to the receiver over the communication network, wherein the selected depth map mode corresponds to the MDP prediction in response to the MDP prediction error being the smallest depth map error, the selected texture data mode corresponds to the MFP prediction in response to the MFP prediction error being the smallest texture data error, and the transmitting the camera viewpoint change, the coded quantized MDP prediction error, and the coded quantized MFP prediction error is in response to the MDP prediction error being the smallest depth map error and the MFP prediction error being the smallest texture data error.

4. The method of claim 1, wherein detecting the camera viewpoint change comprises:

deriving the camera viewpoint change by using tracking information from position sensors.

5. The method of claim 1, wherein detecting the camera viewpoint change comprises:
deriving the camera viewpoint change by using the current frame and the previous frame.

6. The method of claim 1, wherein adjusting the plurality of depth planes comprises:
shifting each of the plurality of depth planes with a corresponding amount based on the camera viewpoint change; and
scaling each of the plurality of depth planes by a corresponding scale factor based on the camera viewpoint change, wherein a depth plane of the plurality of depth planes that is closer to the current camera viewpoint is shifted more and scaled larger in comparison to a depth plane of the plurality of depth planes that is further from the current camera viewpoint.

7. The method of claim 1, further comprising:
capturing the previous frame at a previous time;
separating texture data from the depth map from the previous frame;
coding the texture data from the previous frame;
coding the depth map from the previous frame;
transmitting the coded texture data and the coded depth map from the previous frame to the receiver over the communication network; and
capturing the current frame at a current time being the previous time plus a frame delay.

8. The method of claim 7, wherein the frame delay is based on quantization accuracy in coding based on feedback from a status of the communication network or a status of the receiver over the communication network.

9. The method of claim 1, wherein the first plurality of optical axes intersect a depth plane of the adjusted plurality of depth planes at a plurality of intersection points, and a distance between a first intersection point and a second intersection point of the plurality of intersection points is less than a pixel spacing of an image corresponding to the depth plane.

10. The method of claim 1, wherein the plurality of depth planes are irregularly spaced in distance.

11. A system comprising:
control circuitry configured to:
detect a camera viewpoint change between a current frame from a current camera viewpoint to a previous frame from a previous camera viewpoint, wherein the current frame represents 3D scene;
decompose a reconstructed depth map of the previous frame to a plurality of depth planes, wherein the reconstructed depth map of the previous frame is based on a depth map of the previous frame;
adjust the plurality of depth planes from the previous camera viewpoint to correspond with the current camera viewpoint;
generate a Multi Depth Plane (MDP) prediction by summing pixel values of the adjusted plurality of depth planes along a first plurality of optical axes from the current camera viewpoint;
determine an MDP prediction error between the MDP prediction and a depth map of the current frame; and
quantize and code the MDP prediction error; and
input/output circuitry configured to:
transmit, to a receiver over a communication network, the camera viewpoint change and the coded quantized MDP prediction error for reconstruction of the depth map of the current frame.

12. The system of claim 11, wherein the control circuitry is further configured to:
  decompose a reconstructed texture data from the previous frame to a plurality of focal planes, wherein the reconstructed texture data from the previous frame is based on texture data of the previous frame;
  adjust the plurality of focal planes from the previous camera viewpoint to correspond with the current camera viewpoint;
  generate a Multi Focal Plane (MFP) prediction by summing pixel values of the adjusted plurality of focal planes along a second plurality of optical axes from the current camera viewpoint;
  determine an MFP prediction error between the MFP prediction and the texture data of the current frame; and
  quantize and code the MFP prediction error; and
wherein the input/output circuitry is further configured to:
  transmit, to a receiver over the communication network, the coded quantized MFP prediction error for reconstruction of texture data of the current frame.

13. The system of claim 12, wherein the control circuitry is further configured to:
  generate a 2D intra depth map prediction based on one or more reconstructed pixels of the depth map of the current frame;
  generate a 2D inter depth map prediction based on one or more reconstructed depth maps of the previous frames;
  determine a 2D intra depth map prediction error between the 2D intra depth map prediction and the depth map of the current frame;
  determine a 2D inter depth map prediction error between the 2D inter depth map prediction and the depth map of the current frame;
  determine a smallest depth map error of the MDP prediction error, the 2D intra depth map prediction error, and 2D inter depth map prediction error;
  select a depth map mode corresponding to a type of depth map prediction associated with the smallest depth map error;
  generate a 2D intra texture data prediction based on one or more reconstructed pixels of the texture data of the current frame;
  generate a 2D inter texture data prediction based on one or more reconstructed texture data of the previous frames;
  determine a 2D intra texture data prediction error between the 2D intra texture data prediction and the texture data of the current frame;
  determine a 2D inter texture data prediction error between the 2D inter texture data prediction and the texture data of the current frame;
  determine a smallest texture data error of the MFP prediction error, the 2D intra texture data prediction error, and 2D inter texture data prediction error; and
  select a texture data mode corresponding to a type of texture data prediction associated with the smallest texture data error; and
wherein the input/output circuitry is further configured to:
  transmit the selected depth map mode and the selected texture data mode to the receiver over the communication network, wherein the selected depth map mode corresponds to the MDP prediction in response to the MDP prediction error being the smallest depth map error, the selected texture data mode corresponds to the MFP prediction in response to the MFP prediction error being the smallest texture data error, and the input/output circuitry is configured to transmit the camera viewpoint change, the coded quantized MDP prediction error, and the coded quantized MFP prediction error in response to the MDP prediction error being the smallest depth map error and the MFP prediction error being the smallest texture data error.

14. The system of claim 11, wherein the control circuitry is configured to detect the camera viewpoint change by:
  deriving the camera viewpoint change by using tracking information from position sensors.

15. The system of claim 11, wherein the control circuitry is configured to detect the camera viewpoint change by:
  deriving the camera viewpoint change by using the current frame and the previous frame.

16. The system of claim 11, wherein the control circuitry is configured to adjust the plurality of depth planes by:
  shifting each of the plurality of depth planes with a corresponding amount based on the camera viewpoint change; and
  scaling each of the plurality of depth planes by a corresponding scale factor based on the camera viewpoint change, wherein a depth plane of the plurality of depth planes that is closer to the current camera viewpoint is shifted more and scaled larger in comparison to a depth plane of the plurality of depth planes that is further from the current camera viewpoint.

17. The system of claim 11, wherein the control circuitry is further configured to:
  capture the previous frame at a previous time;
  separate texture data from the depth map from the previous frame;
  code the texture data from the previous frame; and
  code the depth map from the previous frame; and
wherein the input/output circuitry is further configured to:
  transmit the coded texture data and the coded depth map from the previous frame to the receiver over the communication network; and
wherein the control circuitry is further configured to:
  capturing the current frame at a current time being the previous time plus a frame delay.

18. The system of claim 17, wherein the frame delay is based on quantization accuracy in coding based on feedback from a status of the communication network or a status of the receiver over the communication network.

19. The system of claim 11, wherein the first plurality of optical axes intersect a depth plane of the adjusted plurality of depth planes at a plurality of intersection points, and a distance between a first intersection point and a second intersection point of the plurality of intersection points is less than a pixel spacing of an image corresponding to the depth plane.

20. The system of claim 11, wherein the plurality of depth planes are irregularly spaced in distance.

* * * * *